US011893322B2

(12) United States Patent
Ashtekar et al.

(10) Patent No.: US 11,893,322 B2
(45) Date of Patent: *Feb. 6, 2024

(54) METHOD AND SYSTEM FOR PREDICTING WEAR IN A RAIL SYSTEM

(71) Applicant: LORAM TECHNOLOGIES INC., Georgetown, TX (US)

(72) Inventors: Ankur Ashtekar, Weston, MA (US); Wesley Thomas, Boston, MA (US); Ashkan Darbani, West Lafayette, IN (US)

(73) Assignee: Loram Technologies, Inc., Georgetown, TX (US)

( * ) Notice: Subject to any disclaimer, the term of this patent is extended or adjusted under 35 U.S.C. 154(b) by 396 days.

This patent is subject to a terminal disclaimer.

(21) Appl. No.: 16/986,800

(22) Filed: Aug. 6, 2020

(65) Prior Publication Data

US 2021/0406420 A1 Dec. 30, 2021

Related U.S. Application Data

(60) Provisional application No. 63/045,001, filed on Jun. 26, 2020.

(51) Int. Cl.
*G06F 30/20* (2020.01)
*B61K 9/00* (2006.01)
(Continued)

(52) U.S. Cl.
CPC ............. *G06F 30/20* (2020.01); *B61K 9/00* (2013.01); *B61K 9/10* (2013.01); *E01B 31/17* (2013.01);
(Continued)

(58) Field of Classification Search
CPC .......... G06F 30/20; G06F 30/17; G06F 30/23; G06F 30/15; G06F 2119/14;
(Continued)

(56) References Cited

U.S. PATENT DOCUMENTS 5,952,587 A 9/1999 Rhodes et al.
6,301,970 B1 10/2001 Biggs et al.
(Continued)

FOREIGN PATENT DOCUMENTS

CN 108875121 11/2018
CN 109033482 12/2018
(Continued)

OTHER PUBLICATIONS

Ignesti et al. "Development of a model for the simultaneous analysis of wheel and rail wear in railway systems". Multibody Syst Dyn (2014) 31:191-240. DOI 10.1007/s11044-013-9360-0 (Year: 2014).*
(Continued)

*Primary Examiner* — Eunhee Kim
(74) *Attorney, Agent, or Firm* — Parsons Behle & Latimer

(57) ABSTRACT

A system and method is disclosed for predicting and comparing wear scenarios in a rail system. The method can include generating and running a contact model of the interaction between a rail and a train car to produce a simulated loading on the rail for a predetermined time period; generating and running a wear model based on the material properties and/or friction modifier properties of the rail using the simulated loading to produce a simulated wear profile of the rail for the predetermined time period; obtaining a grinding profile to be performed on the rail during the predetermined time period; and generating an updated rail profile by modifying the rail profile by the simulated wear profile and the grinding profile. The method can predict and compare crack growth over time, and provide a financial model and comparison of costs and benefits for different maintenance protocols for the rail system.

20 Claims, 17 Drawing Sheets

(51) Int. Cl.
G06F 30/17 (2020.01)
G06F 30/23 (2020.01)
B61K 9/10 (2006.01)
E01B 31/17 (2006.01)
G06F 119/14 (2020.01)

(52) U.S. Cl.
CPC .............. *G06F 30/17* (2020.01); *G06F 30/23* (2020.01); *G06F 2119/14* (2020.01)

(58) Field of Classification Search
CPC ......... G06F 2119/04; B61K 9/00; B61K 9/10; E01B 31/17; B61L 27/53; B61L 27/60; B61L 23/045
See application file for complete search history.

(56) References Cited

U.S. PATENT DOCUMENTS

| | | | |
|---|---|---|---|
| 6,666,790 | B2 | 12/2003 | Misada |
| 6,814,495 | B2 | 11/2004 | Toda et al. |
| 7,024,344 | B1 | 4/2006 | Nishi |
| 8,210,052 | B1 | 7/2012 | Biggs |
| 8,280,699 | B2 | 10/2012 | Ichishima et al. |
| 8,290,753 | B2 | 10/2012 | Tryon, III et al. |
| 8,302,754 | B2 | 11/2012 | Yagi et al. |
| 8,473,128 | B2 * | 6/2013 | Oldknow ................. B61K 9/08 701/19 |
| 8,504,225 | B2 | 8/2013 | Bieker |
| 9,233,696 | B2 * | 1/2016 | Kumar .................... B61L 27/40 |
| 11,066,087 | B2 | 7/2021 | Yano et al. |
| 2003/0082836 | A1 | 5/2003 | Scott et al. |
| 2004/0201585 | A1 | 10/2004 | Srivastava et al. |
| 2009/0187353 | A1 | 7/2009 | Sakai et al. |
| 2009/0240646 | A1 | 9/2009 | Tryon |
| 2009/0254286 | A1 | 10/2009 | Tulyani et al. |
| 2010/0317477 | A1 | 12/2010 | Sheridan et al. |
| 2015/0286757 | A1 | 10/2015 | Yao |
| 2016/0282229 | A1 | 9/2016 | Qin et al. |
| 2017/0144224 | A1 | 5/2017 | Demuth et al. |
| 2017/0232515 | A1 | 8/2017 | Demuth et al. |
| 2019/0291348 | A1 | 9/2019 | Khairallah et al. |
| 2020/0156676 | A1 | 5/2020 | Chung et al. |

FOREIGN PATENT DOCUMENTS

| | | |
|---|---|---|
| CN | 109910947 | 6/2019 |
| CN | 111339648 | 6/2020 |
| CN | 107103136 | 7/2020 |
| CN | 111460705 | 7/2020 |
| CN | 111597617 | 8/2020 |
| CN | 111859724 | 10/2020 |
| DE | 102015222665 | 12/2016 |
| EP | 1246105 | 10/2002 |
| WO | WO2017055838 | 4/2017 |

OTHER PUBLICATIONS

Meghoe A, Loendersloot R, Bosman R, Tinga T. Rail wear estimation for predictive maintenance: a strategic approach. InEuropean conference of the prognostics and health management society Jul. 2, 2018. 11 Pages. (Year: 2018).*

Brousoulis, Jim, "Numerical simulation of crack growth and wear in rails," Chalmers Tekniska Hogskola (Sweden), 2012, retrieved from <https://research.chalmers.se/en/publication/162848>, retrieved on Jan. 11, 2022.

Ignesti et al., "Development of a Model for the Prediction of Wheel and Rail Wear in the Railway Field," Journal of Computational and Nonlinear Dynamics, Jun. 13, 2021.

Meghoe, Annemieke et al., "Rail wear and remaining life prediction using meta-models," International Journal of Rail Transportation, vol. 8 (2020), issue 1, pp. 1-26, Jun. 2, 2019.

Mingliu, Yue et al., "Analytical modeling of grinding process in rail profile correction considering grinding pattern," Archives of Civil and Mechanical Engineering, vol. 18, issue 2, pp. 669-678, Feb. 2018.

PCT International Search Report and Written Opinion for PCT Application No. PCT/US2021/039415 dated Oct. 14, 2021.

PCT International Search Report and Written Opinion for PCT Application No. PCT/US2021/039417 dated Oct. 14, 2021.

Zhang, Di et al., "Railway Train Wheel Maintenance Model and Its Application," Transportation Research Record Journal of the Transportation Research Board, pp. 28-36, Dec. 2014.

Calvo, Fransisco et al., "Rail track costs management for efficient railway charges," Proceedings of the Institution of Civil Engineers—Transport 2013, 166:6, pp. 325-335 (2013).

Christian Gobert, Edward W. Reutzel, Jan Petrich, Abdalla R. Nassar, Shashi Phoha, "Application of supervised machine learning for defect detection during metallic powder bed fusion additive manufacturing using high resolution imaging.", Additive Manufacturing, Elsevier, NL, NL , (May 1, 2018), vol. 21, doi:10.1016/j.addma.2018.04.005, ISSN 2214-8604, pp. 517-528, XP055601582.

Eadie, Donald et al., "The effects of top of rail friction modifier and wear and rolling contact fatigue: Full-scale rail-wheel test rig evaluation, analysis and modeling," Wear, vol. 265, Issues 9-10, 2008, pp. 1222-1230 (2008).

Ghodrati, Mohamad et al., "Modeling of rolling contact fatigue in rails at the microstructure level," Wear, vols. 406-407, 2018, pp. 205-217 (2018).

Hyde, P. et al., "Planning rail grinding using crack growth predictions," Journal of Mechanical Systems for Transportation and Logistics, 3(1), 2010, pp. 216-225 (2010).

International Search Report issued for PCT International Application No. PCT/US12/55347, dated Nov. 30, 2012.

Jalalahmadi Behrooz, Liu Jingfu, Rios Jason, Slotwinski John, Peitsch Christopher, Goldberg Arnold, Montalbano Timothy, "In-process defect monitoring and correction in additive manufacturing of aluminum alloys", the Vertical Flight Society's 75th Annual Forum & Technology Display, (Jan. 1, 2019), XP055907638.

Jalalahmadi, Behrooz, et al., "A Voronoi FE Fatigue Damage Model for Life Scatter in Rolling Contacts," Journal of Tribology, vol. 132, pp. 021404-1 021404-14, Apr. 2010.

Karpuschenko, Nikolai et al., "Estimation of the life cycle cost of the upper railway track structure," MATEC Web Conf. 216 01008 (2018).

Khanzadeh Mojtaba, Wenmeng Tian, Aref Yadollahi, Haley R. Doude, Mark A. Tschopp, Linkan Bian, "Dual process monitoring of metal-based additive manufacturing using tensor decomposition of thermal image streams", Additive Manufacturing, (Aug. 25, 2018), vol. 23, pp. 443-456, XP055907646.

Liu, Jingfu et al., 'A Multiscale Modeling Suite for Part Qualification in Metal Additive Manufacturing', Tech Connect Briefs, 2019, pp. 135-138.

Malvezzi, M. et al., "Determination of wheel-rail contact points with semianalytic methods," Multibody Syst. Dyn. 20, pp. 327-358 (2008).

Meghoe, A. et al., "Rail Wear Estimation for Predictive Maintenance: a strategic approach," PHM Society European Conference (2018).

Patra, A.P. et al., "Uncertainty estimation in railway track life cycle cost: A case study from Swedish National Rail Administration," Proc. Inst. Mech. Eng., Part F, 223(3), pp. 285-293 (2009).

Patra, A.P., "Maintenance decision support models for railway infrastructure using RAMS & LCC analyses, " PhD Thesis, Lulea University of Technology, Sweden (2009).

PCT/US2021/048883 International Search Report and Written Opinion dated Dec. 21, 2021, 10 pages.

PCT/US2021/053623 International Search Report and Written Opinion dated Jan. 25, 2022, 9 pages.

Popovic, Z. et al., "Managing rail service life," Metalurgija 2014, 140(2), pp. 721-724 (2014).

Raje, Nihar, et al., "A Statistical Damage Mechanics Model for Subsurface Initiated Spalling in Rolling Contacts," Journal of Tribology, vol. 130, pp. 042201-1-042201-11, Oct. 2008.

(56) References Cited

OTHER PUBLICATIONS

Reddy, Venkatarami et al., "Modelling and analysis of rail maintenance cost," International Journal of Production Economics, vol. 105, Issue 2, 2007, pp. 475-482 (2007).
Rupal, Baltej Singh et al., 'Geometric tolerance and manufacturing assemblability estimation of metal additive manufacturing (AM) processes', Materials and Design, Jun. 6, 2020 (available online), vol. 194, pp. 1-15.
Simonovski, Igor et al., "Automatic parallel generation of finite element meshes for complex spatial structure," Computational Materials Science 50.5 (2011): pp. 1606-1618 (2011).
Slack, Trevor, et al., "Cohesive Zone Modeling of Intergranular Fatigue Damage in Rolling Contacts," Tribology International, vol. 44, pp. 797-804, Jul. 2011.
Vandoorne, R. et al., "Stochastic rail life cycle cost maintenance modelling using Monte Carlo simulation," Proc. Inst. Mech. Eng., Part F: J. Rail Rapid Transit. 232 (4), pp. 1240-1251 (2018).
Warhadpande, A., et al., "Effects of Surface Defects on Rolling Contact Fatigue of Heavily Loaded Lubricated Contacts," Proc. I Mech E, Part J: J. Engineering Tribology, Oct. 1, 2010 vol. 224 No. 10, pp. 1061-1077.
Yadollahi, A. et al., 'Fatigue life prediction of additively manufactured material: Effects of surface roughness, defect size, and shape', Fatigue & Fracture of Engineering Materials & Structures, 2018, vol. 41, pp. 1602-1614 (internal pp. 1-13).
Zoeteman, A., "Life cycle costs analysis for managing rail infrastructure: Concept of a decision support system for railway design and maintenance," Eur. J. Transport Infrastruct. Res., vol. 1, No. 4, pp. 391-413 (2001).

* cited by examiner

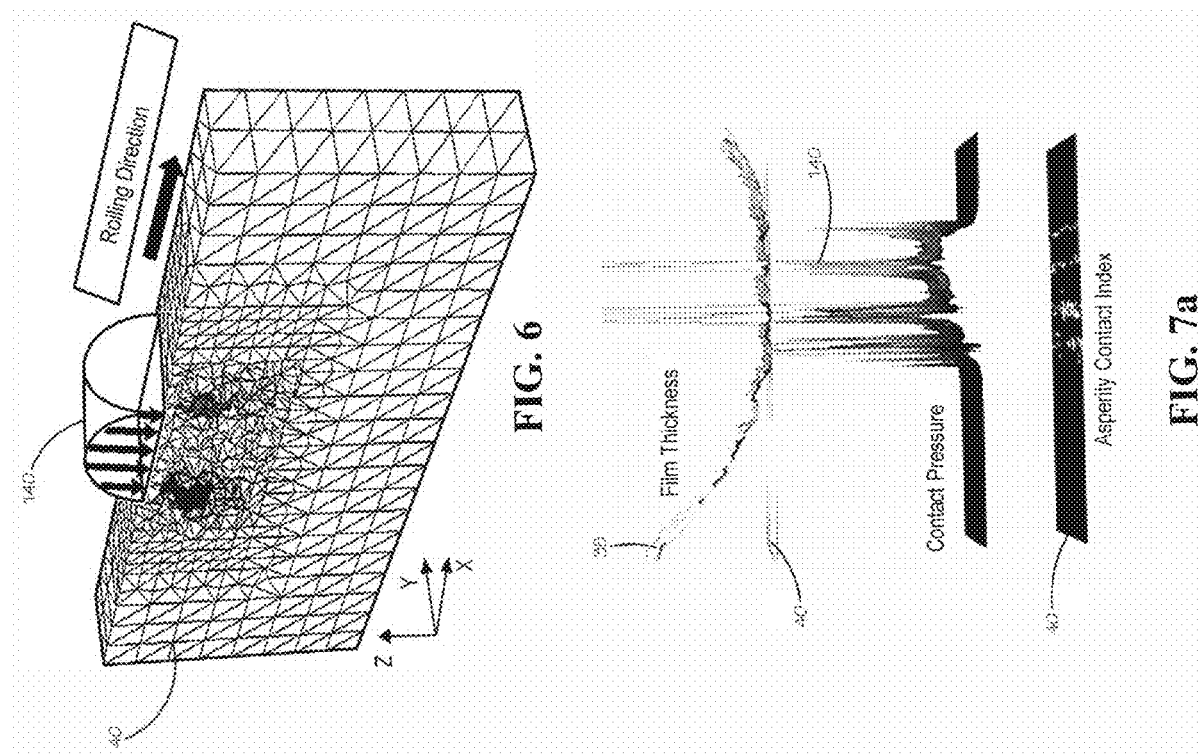

Mixed-EHL pressure profiles for progressively smoother surface roughness (scaled RMS)

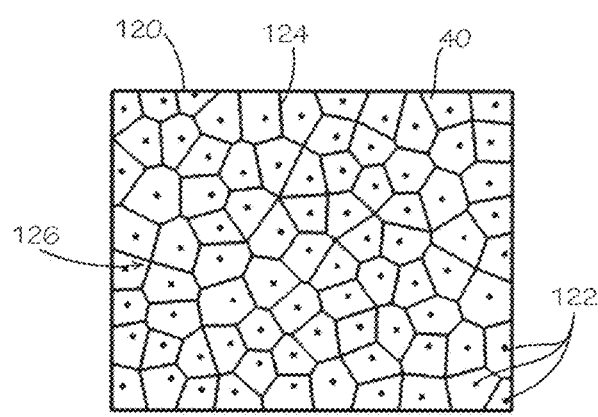 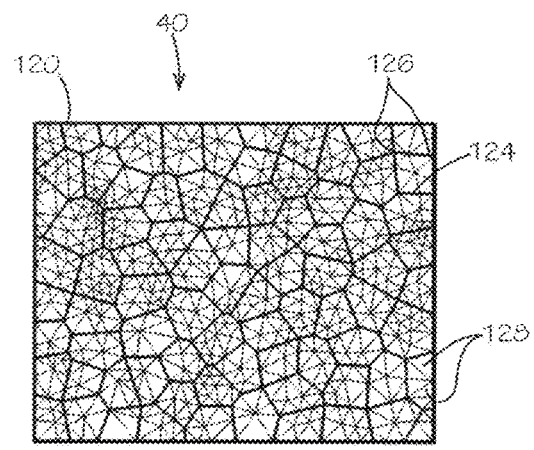
FIG. 10a  FIG. 10b

FIG. 17

| Economic Calculation Home > Baseline | | | | | | |
|---|---|---|---|---|---|---|
| General Assumptions | Depreciation | Capital | Maintenance | Rail Grinding - Lease | Lubricant | Inspection |

| Grinding | | Strategy | | Labor Data | |
|---|---|---|---|---|---|
| Contracted Service? | Yes | Preventive Miles Ground - Tangent | 0 | Average Reprofiling Speed | 1.7 |
| Total Grinding Cost | 427,537.45 | Preventive Miles Ground - Mild Curves | 0 | Grinder Passes (Preventive) | 1 |
| Total Cost Preventive Only | 0.00 | Preventive Miles Ground - Medium Curves | 0 | Grinder Speed - Preventive | 1.70 |
| Grinding Cost per Day | 1,170.53 | Preventive Miles Ground - Severe Curves | 0 | Grinder Passes (Corrective) | 14 |
| Grinding Cor per Grinder per Day | 1,170.53 | Corrective Miles Ground - All | 0 | Grinder Speed - Corrective | 0.12 |
| Grinding Cost per Pass Mile | 6,786.31 | Total Track Miles Ground | 0 | Ratio of Pass Miles Ground to Track Miles Covered | 15.00 |
| Lease Cost | 364,000.00 | Total Pass Miles Ground | 0 | Spark Time Required for Preventive Grinding | 0.00 |
| Labor Cost | 63,537.45 | Corrective / Preventive % | 0 % | Spark Time Required for Corrective Grinding | 37.06 |
| Material Cost | 0.00 | Years of Grind Plan | 0 | Train Delay Time/Shift | 5 |
| Cost Due to Surface Fatigue | 427,537.45 | Depreciation/Lease | | Customer Delay / Machine Delay / Contractor Delay | 0 |
| Cost Due to Subsurface Fatigue | 0.00 | Number of Grinders | 0 | Average Available Track Time per Shift | 3.00 |
| Cost Due to Weld Failures | 0.00 | Lease Cost per Work Day | 13000 | Travel Time/Shift | 1.66 |
| Cost Due to Wear | 0.00 | Lease Cost per Pass Mile | 0 | Avg per-shift spark time | 1.34 |
| | | | | Total Shifts Required | 28.00 |

FIG. 18

FIG. 19

METHOD AND SYSTEM FOR PREDICTING WEAR IN A RAIL SYSTEM

CROSS-REFERENCES TO RELATED APPLICATIONS

This application is a non-provisional of U.S. Patent Application No. 63/045,001 filed Jun. 26, 2020 entitled METHOD OF PREDICTING WEAR IN A RAIL SYSTEM, which is hereby incorporated by reference in its entireties.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to managing wear and maintenance of a rail system.

More particularly, the present disclosure relates to wear caused on a rail of a train track due to forces exerted into the rail by passing trains over time. In the rail industry, a significant maintenance expense is incurred to maintain the rail geometry in order to maintain a desired wheel-rail interface and prevent train derailments. Over time, as the wheels pass over a rail, the stresses cause wear (physical removal of material) as well as cracking in the rail due to rolling contact fatigue. The removal of the material through wear-and-tear disturbs the wheel-rail interface. Class 1 railroads spend billions of dollars per year periodically "regrinding" the rails to reform the rail to a correct or desired rail profile, and to remove any cracks formed in the rail surface. This is a significant operational as well as logistics challenge, because the scheduling of the rail-grinding trains has to be coordinated with the revenue-generating trains.

Today's management of grinding and maintenance operations of rail systems are limited to rail operators and maintenance crews visually inspecting rails for wear and defects such as cracks. Rail operators can also consult manuals and guidelines that have been developed over time that include recommended maintenance guidelines or indexes that are based on compilations of observed or manually derived rail wear data which are at best general models of rail wear for a particular rail system. The data used to generate these manuals or guidelines are limited to academic studies and occasional root cause analysis after significant events, e.g. derailments. Using more general wear models can lead to insufficient grinding operations being performed to maintain the proper wheel/rail interface, which can lead to dangerous operating conditions for the rail system. Using more generalized models for rail wear can also lead to unnecessary grinding operations being implemented, which can lead to faster overall wear (natural wear and grinding wear) on the rails of the train tracks. Accelerated overall wear can require that rail lines be replaced sooner than necessary which can increase the costs associated with the rail lines.

What is needed then are improvements in systems and methods for predicting wear in rail systems.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a method for modeling wear in a rail of a train track due to estimated train traffic. The method can include obtaining material properties of the rail, a rail profile of the rail, and a train wheel profile of a wheel of a train car; generating a contact model of the interaction between the rail and the train car based on the rail profile, the train wheel profile, and estimated train traffic on the rail; running the contact model to produce a simulated loading on the rail for a predetermined time period using the rail profile; generating a wear model based on the material properties and/or friction modifier properties of the rail; running the wear model using the rail profile and the simulated loading from the contact model to produce a simulated wear profile of the rail for the predetermined time period; obtaining a grinding profile for at least one grinding operation performed on the rail during the predetermined time period; and generating an updated rail profile by modifying the rail profile by the simulated wear profile and the grinding profile.

Another aspect of the present disclosure is a method for modeling wear and crack growth in a rail of a train track due to estimated train traffic. The method can include obtaining material properties of the rail, a rail profile of the rail, and a train wheel profile of a train car, the rail profile including a crack profile; generating a contact model of the interaction between the rail and a wheel of a train based on the rail profile, the train wheel profile, and estimated train traffic on the rail; running the contact model to produce a simulated loading on the rail for a predetermined time period using the rail profile; generating a wear model based on the material properties and/or friction modifier properties of the rail; running the wear model using the rail profile and the simulated loading from the contact model to produce a simulated wear profile of the rail for the predetermined time period; generating a crack growth model based on the crack profile; running the crack growth model using the rail profile, the crack profile and the simulated loading to produce a simulated crack growth profile of the rail profile for the predetermined time period; and generating an updated rail profile with an updated crack growth profile by modifying the rail profile by the simulated wear profile and the simulated crack growth profile.

Another aspect of the present disclosure is a financial modeling that can help train operators make maintenance decisions for a rail system based on a financial economic analysis associated with different maintenance protocols or operating scenarios. A method for modeling wear in a rail of a train track due to estimated train traffic in order to provide maintenance recommendations for the train track, the method including the steps of obtaining a train wheel profile of a train car; providing two or more sets of maintenance parameters, each set of maintenance parameters including: rail profile; grinding parameters; and rail material properties; wherein at least one pair of corresponding maintenance parameters in the two or more sets of maintenance parameters is different from one another. For each of the at least two sets of maintenance parameters, the method can include: generating a contact model of an interaction between the rail profile and a wheel of a train based on the rail profile, the train wheel profile, and estimated train traffic on the rail; and generating a wear model based on the material properties. The method can include performing a wear simulation using the rail profile for a predetermined time period by: running the contact model to produce a simulated loading; running the wear model to produce a simulated wear profile based on the simulated loading; and generating an updated rail profile by modifying the rail profile by the simulated wear profile. The wear simulation can be repeated iteratively using the updated rail profile and subsequent updated rail profiles until a final updated rail profile exceeds a predetermined wear limit for the rail. The method can include calculating a wear time until the final rail profile exceeds the predetermined wear limit, and comparing a cost value for each set of maintenance parameters, the cost value based on maintenance costs associated with the corresponding set of maintenance parameters. The method can further include recommending or selecting the set of maintenance parameters having the lower cost value.

The methods disclosed herein for modeling wear, crack growth, and grinding can help rail operators optimize rail life by experimenting with and modeling various aspects of the rail itself or the maintenance protocols associated with such rails to determine wear or rail life, without having to perform expensive and time-consuming physical or in-revenue service testing. The financial modeling methods described herein can also help an operator optimize or balance extending wear or rail life of a rail with the costs associated with installing and maintaining the rail to achieve that rail life.

Another aspect of the present disclosure is a computer system operable to implement the various methods described herein. The computer system can include an input device operable to receive various inputs and parameters, an output device for displaying information or results generated from performing the methods described herein, a memory for storing pertinent information as well as computer-executable instructions to implement the methods described herein via a processor. Implementing the methods disclosed herein on a computer based system can help an operator quickly and conveniently perform the various technical simulations disclosed and readily test different operating parameters in the simulations discussed to drive their decision making process with respect to installation and maintenance of a rail or train track system.

Numerous other objects, advantages and features of the present disclosure will be readily apparent to those of skill in the art upon a review of the following drawings and description of a preferred embodiment.

BRIEF DESCRIPTION OF THE DRAWINGS

FIG. 6 is a schematic diagram of finite element model of a rail of train track system as a rolling contact pressure from the wheel of a train passes over the rail.

FIG. 7a is a schematic diagram showing the effect of asperity contact or surface irregularities of the rail or train wheel on the contact pressure exerted on the rail.

FIG. 10a is a schematic diagram of a finite element model for a rail of a train track system which can be utilized for the simulations disclosed herein.

FIG. 10b is a schematic diagram of another embodiment of a finite element model for a rail which can be used for the simulations disclosed herein, the finite element method having even smaller finite elements within the grain boundaries of the finite element model of FIG. 10a to create a finite element mesh.

FIG. 17 is a picture of an input interface for a financial modeling method of the present disclosure showing various general inputs and assumptions for the rail associated with the financial model.

FIG. 18 is a picture the input interface of FIG. 17 showing various grinding parameters which can be utilized for a financial modeling method of the present disclosure.

FIG. 19 is a picture of the input interface of FIG. 17 showing various lubrication parameters which can be utilized for a financial modeling method of the present disclosure.

DETAILED DESCRIPTION

Figure 1:
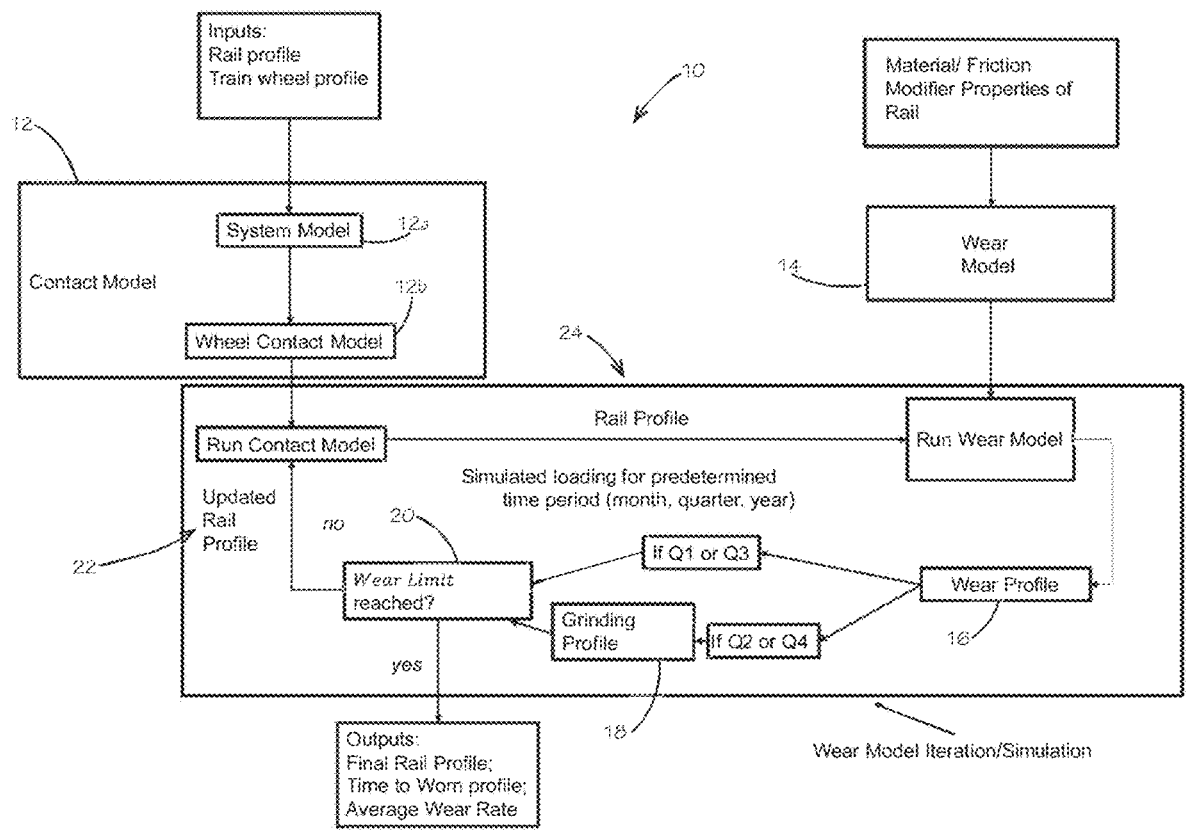
FIG. 1 is a schematic diagram of one embodiment of a method of predicting wear of the present disclosure.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the invention and do not delimit the scope of the claimed invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present disclosure may include a system and method for predicting wear and other performance factors, such as crack growth, in a rail of a train track system. Material wear, or the slow removal of material from the rail, can be caused by the active, load transmitting contact forces applied on the rail from a wheel of a train car over time. Rails may also degrade over time due to the formation of microscopic cracks, which grow under continued usage and contact forces applied by the wheels of trains passing over the rail. Embodiments of the present disclosure may provide accurate, physics-based prediction of wear and crack growth for rails in a train track system. Embodiments of the present disclosure may also provide a tool for designers and rail operators to evaluate the performance of rails in a train track system under a variety of scenarios (e.g., with varying materials, manufacturing processes or rail profiles, friction modifiers including but not limited to lubricants, operating conditions such as grinding conditions, etc.) without having to resort to expensive, time consuming testing or other methods, and perform financial modeling to determine which scenario may be the most cost efficient scenario regarding maintenance of the rails.

Embodiments of the present disclosure may consider certain aspects of the wear process in rail systems, the unique combination of which may allow for a more accurate and flexible prediction of wear life in a rail. For instance, consideration of friction modifier or lubrication conditions (e.g., mixed-elastohydrodynamic lubrication and other conditions) may provide a detailed solution for surface pressures, tractions, and other loads (e.g., asperity interaction, asperity contact) placed upon the rails of the train track system. Embodiments of the present disclosure may simulate or allow for simulation of the random microstructure topology and composition in steels (e.g., polycrystalline high strength steels other steels), composites, and/or other materials utilized for the rails based on measured material characteristics and parameter distributions. Embodiments of the present disclosure may provide, calculate, or determine a finite element solution (e.g., a high fidelity finite element solution), numerical solution, and/or analytical solution describing stress in the microstructure of a rail of a train track system, including, for example, highly localized near-surface contact stresses due to asperity interaction. Embodiments of the present disclosure may predict, calculate, or determine the location and number of load cycles until crack nucleation and/or initiation in the grain structure of the rail being analyzed. Embodiments of the present disclosure, may predict crack network evolution through short crack growth, coalescence, on through to failure, including possible self-arrest, or transition to long crack growth regime. Various other benefits may be realized from embodiments of the present disclosure.

Wear Modeling

One aspect of the present disclosure is a method and system for modeling wear in a rail of a train track due to estimated train traffic. As seen in FIG. 1, the method 10 can include obtaining material properties of the rail, a rail profile of the rail, and a train wheel profile of a wheel of a train car; generating a contact model 12 of the interaction between the rail and the train car based on the rail profile, the train wheel profile, and estimated train traffic on the rail; running the contact model 12 to produce a simulated loading on the rail for a predetermined time period using the rail profile; generating a wear model 14 based on the material properties and/or friction modifier properties of the rail; running the wear model 14 using the rail profile and the simulated loading from the contact model 12 to produce a simulated wear profile 16 of the rail for the predetermined time period; obtaining a grinding profile 18 for at least one grinding operation performed on the rail during the predetermined time period; and generating an updated rail profile 22 by modifying the rail profile by the simulated wear profile 16 and the grinding profile 18. In some embodiments, the method can further include the step 20 of determining whether the updated rail profile 22 exceeds a predetermined wear limit for the rail. In some embodiments, the simulated wear profile 16 includes a wear depth profile and generating the updated rail profile 22 includes subtracting the wear depth profile from the rail profile.

In some embodiments, the method can include running a wear simulation more than once, and can include running the contact model 12 to produce a second simulated loading on the rail for a second predetermined time period using the updated rail profile 22; running the wear model 14 using the updated rail profile 22 and the second simulated loading from the contact model 12 to produce a second simulated wear profile of the rail for the second predetermined time period; and generating a second updated rail profile by modifying the updated rail profile 22 by the second simulated wear profile. In some embodiments, the method can include obtaining a second grinding profile for a second grinding operation performed on the rail during the second predetermined time period; and generating a second updated rail profile by modifying the updated rail profile by the second simulated wear profile and the second grinding profile.

Figure 11:
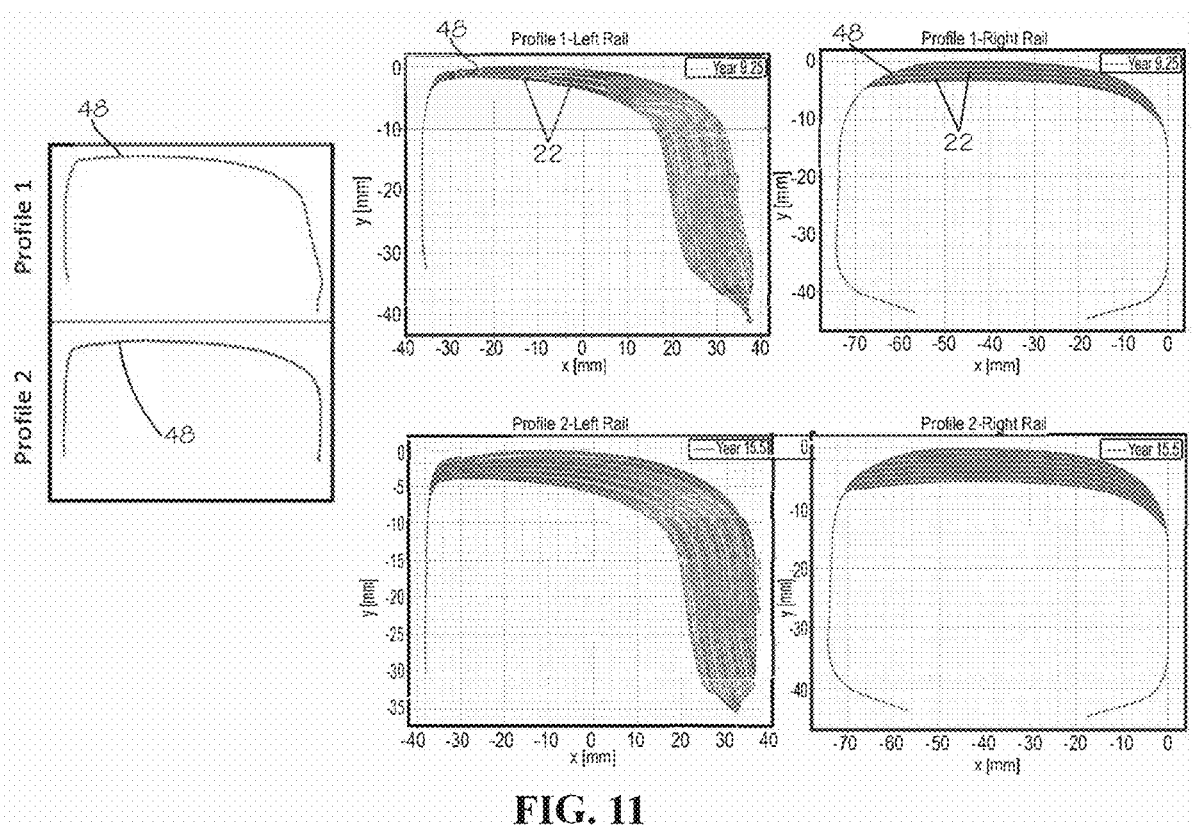
FIG. 11 is a graph of an exemplary wear simulation applied to two different rail profiles over time showing an initial rail profile and subsequent updated rail profiles creating during each iteration of a wear simulation to show the wear of each of the rail profiles over time.
Figure 12:
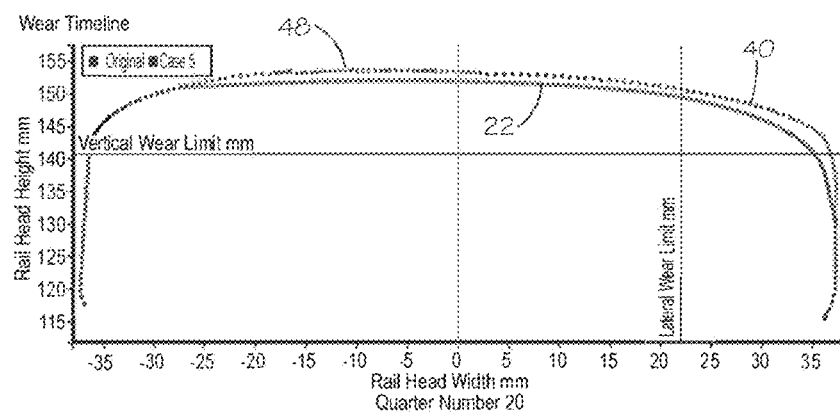
FIG. 12 is a plot of an initial rail profile and an updated rail profile associated with quarter 20 of as wear simulation, the plot showing vertical and lateral rail wear limits for the rail profile.
Figure 13:
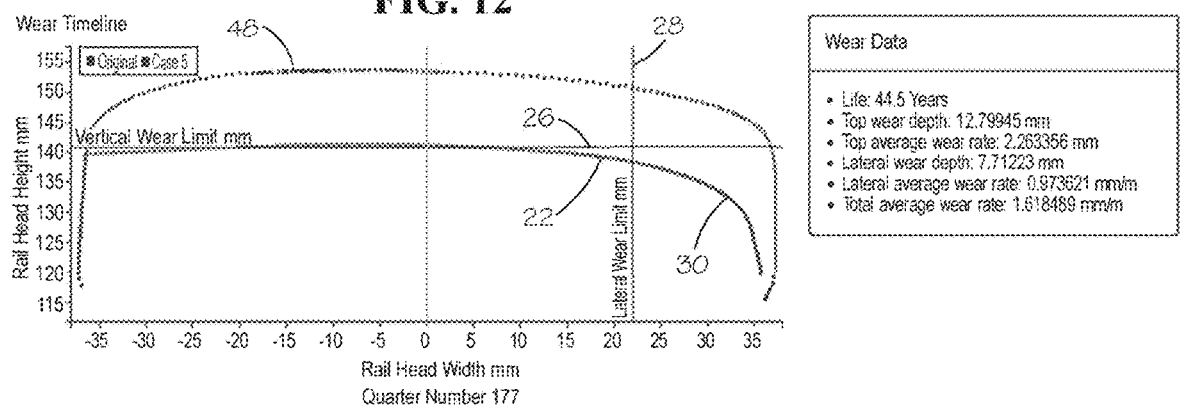
FIG. 13 is a plot of the rail profile of FIG. 12 and a final updated rail profile associated with a final quarter of the wear simulation wherein the final updated rail profile exceeds a vertical wear limit for the rail profile.

In some embodiments, as shown in FIG. 1, the method can include iteratively performing a wear simulation 24 to determine a wear time or usable life of the rail. The method can further include performing or repeating iteratively with the updated rail profile 22 and subsequent updated rail profiles for corresponding subsequent predetermined time periods the following steps: running the contact model 12 to produce a subsequent simulated loading; running the wear model to produce a subsequent simulated wear profile based on the subsequent simulated loading; and generating the subsequent updated rail profile by modifying an immediately prior updated rail profile 22 by the subsequent simulated wear profile; wherein the iteration is completed, as shown in FIGS. 11 and 12, when a final subsequent rail profile 30 exceeds a predetermined wear limit for the rail. As such, the wear simulation 24 can be rerun in succession using subsequent updated rail profiles 22 until the predetermined wear limit is reached. Such a wear limit can be either a vertical wear limit 26 or a lateral wear limit 26.

In some embodiments, once the wear limit is reached, the method can include calculating a wear time until the rail reaches a predetermined wear limit. The wear time can be a summation of all of the predetermined time periods accounted for in the wear simulation, or the product of the predetermined time period by the number of iterations of the wear simulation performed. In some embodiments, once the wear limit is reached, the method can further include calculating an overall top wear depth, an average top wear rate, a lateral wear depth, a lateral wear rate, a combined wear depth, and a total average wear rate (an average of the top and lateral wear rates).

For embodiments including an iterative wear simulation 24, the method can further include obtaining a subsequent grinding profile and generating the subsequent updated rail profile by updating the immediately prior updated rail profile 22 by the subsequent wear profile and the subsequent grinding profile for at least one iteration of the wear simulation 24. As can be seen from FIG. 1, grinding operations can be performed in the wear simulation 24 only for a portion of the predetermined time periods in the iterated wear simulation. For instance, in some embodiments, the predetermined time period can be a calendar or fiscal quarter, and grinding may only be performed in every other quarter. In other embodiments, grinding can occur in every third, fourth, fifth, sixth, etc. quarter. In some embodiments, grinding can occur at regulated intervals, or grinding can be spaced out more at the beginning of the usable life of the rail and gradually increase over time as the rail becomes more susceptible to wear and crack growth such that more frequent grinding can be required.

While the predetermined time period is shown in FIG. 1 as quarters, the predetermined time period in other embodiments can be any suitable time period, including days, weeks, months, quarters, years, etc. The accuracy of the modeling can increased with smaller predetermined time periods. However, in computer modeling systems, smaller time periods, and thus more iterations until the wear limit is reached, can increase the computing requirements and time to run an iterative wear simulation. In some embodiments, as shown in FIG. 11, the method can further include generating a plot of the rail profile, updated rail profile, and subsequent updated rail profiles over time as the wear simulation is iterated to produce subsequent updated rail profiles. As such, the plot can show the effect of wear and grinding on the rail and the rail profile over time.

Material properties for a rail or rail profile can include, but are limited to, strength of the material, toughness of the material hardness of the material, hardness of the material, brittleness of the material, friction properties of the material without lubricants or other friction modifiers, resilience, etc.

The wear modeling methods described herein can be utilized by rail operators and installers to model the wear life of contemplated rail systems. The modeling method can also be utilized to help maximize or optimize the wear life of a rail system. For instance, different rail profiles 46 can be investigated using the various methods disclosed herein as shown in FIG. 11 to model and predict which rail profile 46 can provide longer wear life. Variations in grinding parameters such as the frequency of grinding operations and the depth of the grinding operations can also be modeled independently to determine which grinding parameters maximize or optimize wear life.

Figure 2:
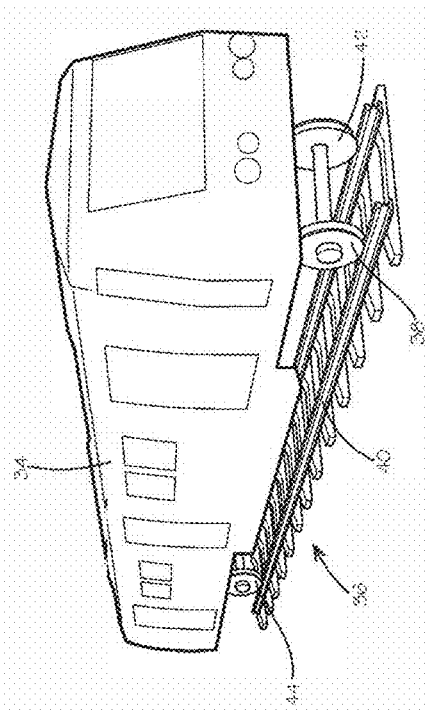
FIG. 2 is a perspective view of a train track system which can be utilized to generate a system model for the method of FIG. 1, the system including a train car and a train track with rails.
Figure 3:
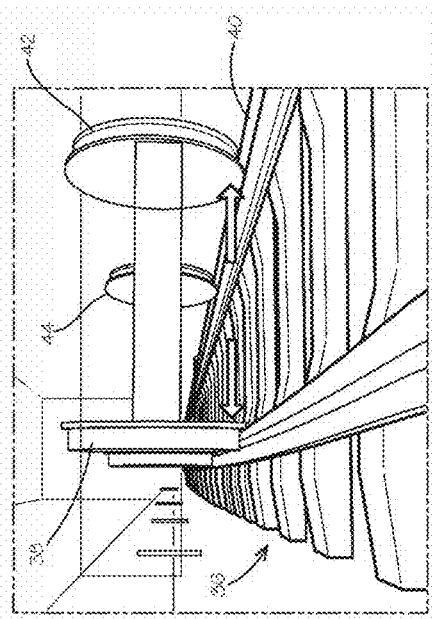
FIG. 3 is a perspective view of the wheels of the train car of FIG. 2 interacting with the rails of a train track.

In some embodiments, the contact model further includes a system model 12$a$ of the interface between the train car 34 and the train track 36 and a wheel contact model 12$b$ of the interface between the wheel 38 of the train car 34 and the rail 40, the train track 36 including multiple rails 40 connected to one another by rail ties and fasteners. As shown in FIGS. 2-3, in conventional train cars 34, at least two sets of train wheels 38 can be included on each train car 34. A front set of wheels 42 can have different force and pressure profiles, as well as different locations on the rail 40 where such forces or pressure profiles can be applied, than the back set of wheels 44 as the train car 34 passes over the rail 40. This can be particularly true on curved track segments as front wheels 42 initiating a turn on the rail 40 may exert different forces on the rail 40 and at different locations compared to the forces exerted by the back wheels 44 of a train car 34 completing the turn. The system model 12$a$ can account for these different pressure profiles and pressure locations on the rail 40 between different sets of wheels 42, 44 on the train car 34 and provide a system model 12$a$ of the forces acting on the rail 40 by an entire train car 34 and not just one wheel 38. Train traffic can then be quantified in the contact model 12 as the number of train cars 34 passing over the rail 40 in a predetermined time period. In some embodiments, the system model 12$a$ can include the Vampire® Vehicle-Track Interface modeling and simulation software. However, any suitable modeling program or software can be utilized as a system model 12$a$ to sufficiently model the interface between the train car 34 and the train track 36.

Figure 4:
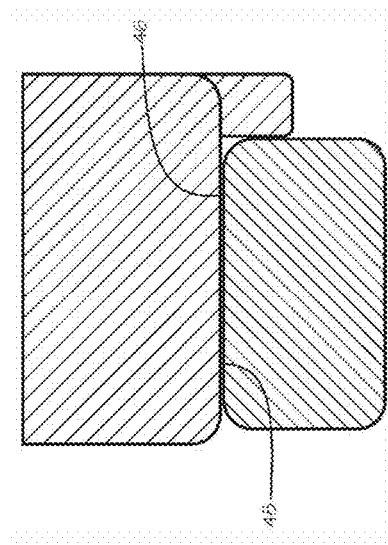
FIG. 4 is an exemplary cross sectional view of the interface between a train wheel of a train car and a rail of a train track system.
Figure 5:
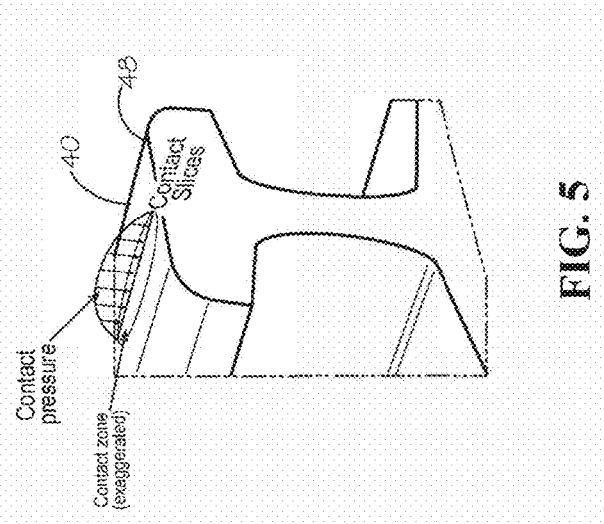
FIG. 5 is a perspective view of contact pressure forces from the wheels of a train car being applied on a rail of a train track.

The wheel contact model 12$b$ can apply the different contact forces from the system model 12$a$ and apply them as rolling contact forces onto the geometric interface between a train wheel profile 46 and a rail profile 48, shown in FIG. 4, or updated rail profiles produced during an iterative wear simulation. The wheel contact model 34 in some embodiments can include the CONTACT™ wheel-rail interface software provided by VORtech CMMC. In other embodiments, any suitable wheel contact modeling simulation or software can be used for the wheel contact model 12b. The combination of the system model 12a and the wheel contact model 12b can be used to produce a simulated loading on the rail 40 which takes into account overall system forces of the train car 34 on the rain track 36 as those forces are applied to the interface between the train wheels 38 and the rail 40 of the train track 36.

Figure 14:
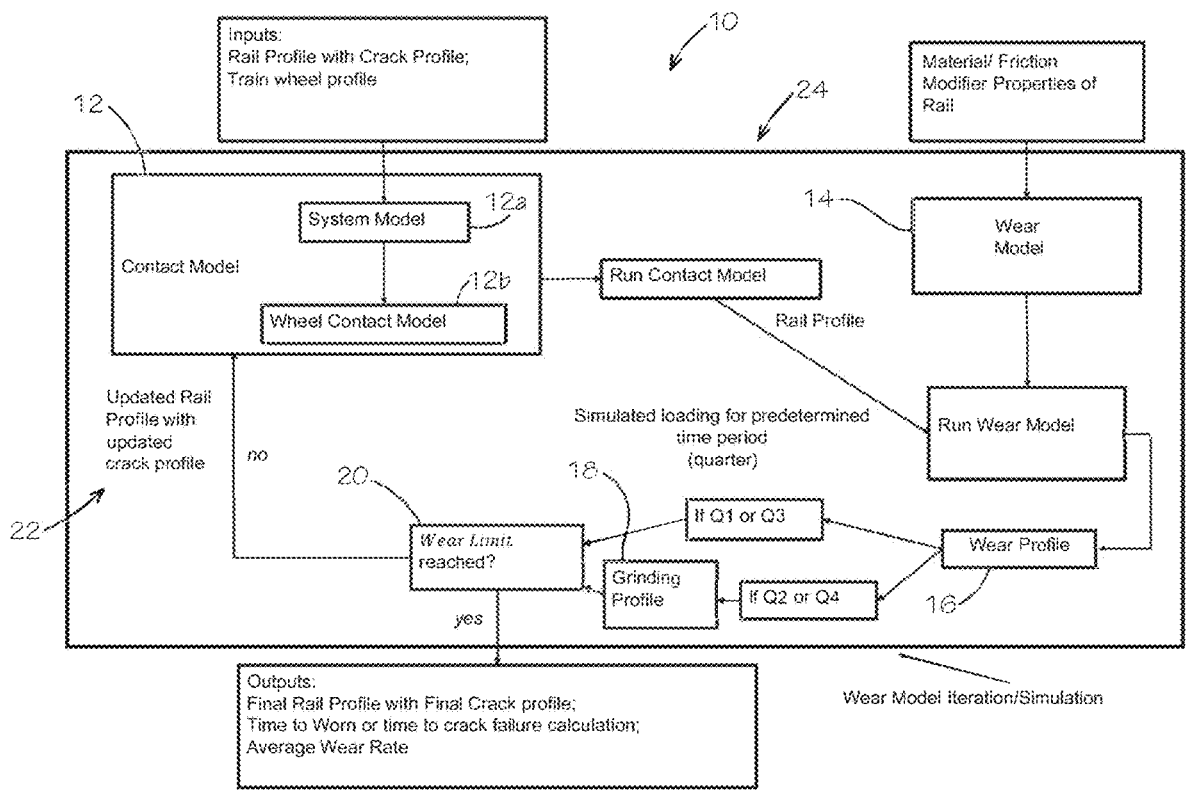
FIG. 14 is a schematic view of another embodiment of a method of predicting wear in a rail wherein the contact model for modeling the interaction between the rail and the train wheel is included in the wear simulation look such that contact model can be updated with an updated wear profile during each iteration of the wear simulation.

In some embodiments, as shown in FIG. 14, generation of the contact model 12 can be included in the wear simulation loop 24, such that the method 10 can further include regenerating the contact model 12 of the interaction between the rail and a train based on the updated rail profile 22, the train wheel profile, and estimated train traffic on the rail; running the contact model 12 to produce a second simulated loading on the rail for a second predetermined time period using the updated rail profile 22; running the wear model 14 using the updated rail profile 22 and the second simulated loading from the contact model 12 to produce a second simulated wear profile of the rail for the second predetermined time period; and generating a second updated rail profile by modifying the updated rail profile by the second simulated wear profile. In embodiments including an iterative wear simulation, the contact model 12 of the interaction between the rail and a train can be regenerated for each iteration of the wear simulation 24 utilizing the updated rail profile 22 and each subsequent updated rail profile until the simulation is ended. Second or subsequent grinding profiles can be included in one or more iterations of such iterated wear simulations 24. Having the contact model 12 be regenerated during more than one and/or each iteration of the wear simulation 24 can help provide a more refined simulated loading model over time. As the rail profile changes over time, so will the loading characteristics between the train car and/or wheels of the train and the rail. Updating the contact model 12 can help more accurately model the wheel/rail interface over time and produce a more accurate wear model 14 for the rail.

In some embodiments, generating the contact model includes generating a finite element model based on the material properties of the rail, wherein the finite element model describes a grain structure of the rail and represents crystalline or polycrystalline properties of the rail, as shown in FIGS. 10a and 10b. In some embodiments, a finite element model may include a numerical technique which may be used to determine the response of a volume of material utilized for the rail to an applied loading situation, the finite element model subject to constitutive or connective relationships and boundary conditions. The material volume of the rail can be discretized by a complex system of points or nodes that define discrete elements of the material volume, as shown in FIGS. 10a and 10b. By defining basis functions for each element and utilizing a constitutive or connective relationship to define the elastic/plastic behavior of the material, a finite element model can be used which incorporates a system of algebraic equations for the finite element model, which may be solved using conjugant gradient or other methods.

A random micro-structure instance 120 for the rail may be calculated, created or generated as part of the contact model. The random microstructure instance 120 may serve as a finite element model describing or modeling the grain structure of the rail 40 to be analyzed. A finite element model may be a group or series of discrete equations or data points that are related to each other. The finite element model describing the material grain structure of the rail 40 may represent the rail's crystalline or polycrystalline properties. A finite element model may be generated to account for various material properties associated with different materials that be used for the rail. Information pertaining to the particular material (e.g., material specimen) of interest, out of which a rail can be made, may be gathered, downloaded and or input into the computer system 100.

In some embodiments, information pertaining to the material of interest may be gathered by a person through either physical examination via optical microscopy and/or scanning electron microscopy of sample material specimens obtained from the component of interest or via a survey of published material properties found in the open literature or through some combination thereof. Information may, for example, be a gathered by user through physical examination of a specimen pf the rail using, for example, a microscope (e.g., an optical microscope, electron microscope, scanning electron microscope), physical inspection (e.g., visual, tactile, etc.), or other type of inspection. Data or information relating to the rail may, for example, be obtained or gathered from published material properties, e.g., found in the open literature (e.g., journals, textbooks, publications, etc.), electronic databases, or other sources. Data describing the statistical distributions of both the geometric features and physical composition of the microstructure for a given material may be assembled, combined, or aggregated by a person, system, or processor associated with the computer system 100 (e.g., processor 102) into one or more data files. The one or more data files may be used throughout the simulation process. A memory 104 or other storage device may store these material properties.

Utilizing information such as size, composition, and other distributions, an instance 120 of a random polygonal (e.g., polyhedral or other shape) crystalline structure may be generated by system 100 (e.g., by processor 102) using a Voronoi tessellation 110 or other suitable process. The Voronoi tessellation process may include filling the domain or space of interest with randomly placed nucleation points 122 or seed points, consistent with microstructure geometric information gathered, provided, or generated. Nucleation points 122 may be localized areas within a crystal or crystalline material that exhibit a distinct thermodynamic phase. The nucleation points may create the grain structure of the rail 40. Different materials may have different nucleation characteristics and grain structure due to the atomic structure or manufacture of the materials. For example, the number of nucleation points 122 per volume in a material may depend on the crystallization process used, the solute concentration or suspension density of the crystal solute used in the material. The randomly placed nucleation points 122 may simulate or represent the geometric or other information input into system 100. Regions may be constructed or generated around each nucleation point such that all points enclosed by the region are closer to that particular nucleation point 122 than any other nucleation point in the domain. The resulting regions may be convex polygons (e.g., polyhedra or other shapes) each, for example, representing an individual grain in the microstructure. Random distribution of the nucleation points 122 may help provide topological randomness in the microstructure. System 100 may, in some embodiments, store the description of the Voronoi tesselation in the database 112 (e.g., in a data file), which may, for example, include Cartesian coordinates for each nucleation point, Cartesian coordinates for each corner (e.g., vertex) of the polygons (e.g., polyhedra), and/or a list of vertices associated with each seed point. A table, hash table, map, or other data structure may include nodes that represent these vertices and nucleation points 122, and may also describe the relation or connectivity between each node.

According to some embodiments, the Voronoi tessellation, now representing or simulating the microstructure (e.g., grain microstructure) of the material specimen (e.g., steel material present in high strength steels or other materials), may serve as the finite element model, or may be further discretized or meshed into smaller finite elements 128 to form a finite element mesh by system 100 using triangular, tetrahedral or other shaped elements. The finite element mesh may also be based on the material properties of the rail 40. The resulting meshed domain may be an instance of a random microstructure representative volume. System 100 may store the description of the mesh in a data file (e.g., stored in memory 104, database 106, etc.) containing Cartesian coordinates of the nodes 122 and connectivity information to define the triangular or tetrahedral elements from the nodes 122.

Figure 7B:
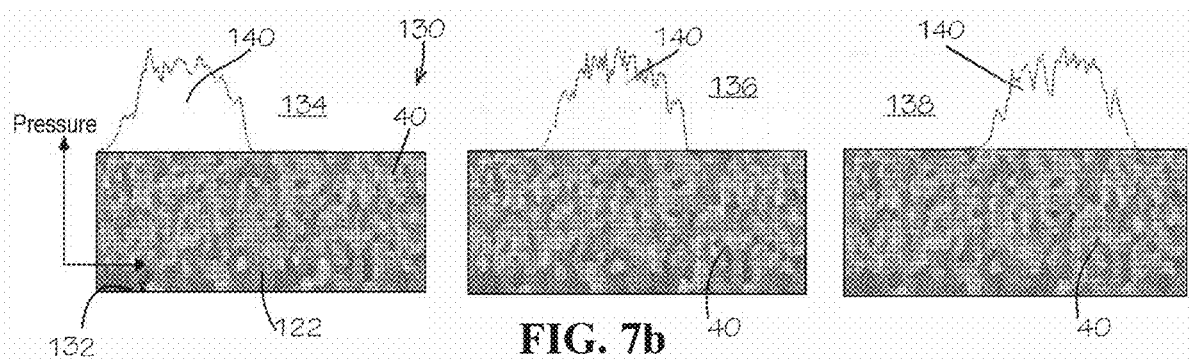
FIG. 7b is a plot of an exemplary surface pressure time history showing the surface pressure on the rail during discrete time periods as the train wheel moves along the rail.
Figure 8:
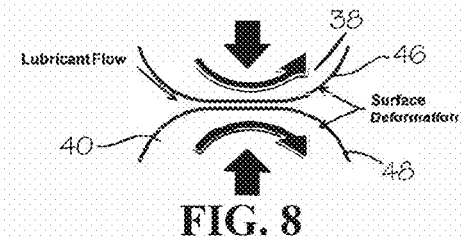
FIG. 8 is a cross sectional view showing lubricant being deposited between a rail and a train wheel.

According to some embodiments, as shown in FIG. 7a, a finite element model describing or modeling stresses in the microstructure or grain structure may be determined for each load event or loading cycle of a simulated loading 130 for a predetermined time period onto the finite element model, e.g., random microstructure instance 122. In a train track system, a loading event or loading cycle of the simulated loading 130 can be the passage of a single wheel of a train car or the passage of all wheels of a train car over the rail. Depending on the estimated train traffic occurring on a particular rail being analyzed, the number of load cycles occurring within a predetermined time period can vary in different simulated loading 130. Stresses in the finite element model for a loading event in some embodiments may be calculated or determined in response to an externally calculated surface pressure time history 132 which may be read or input into system 100. A surface pressure time history 132 may describe or model the loading boundary conditions describing a single load event in sequential time steps 134, 136, 138. Surface pressure 140 may include surface traction and bulk load exerted on the rail 40 during a load event, or contact by a wheel of a train. Surface traction may be the frictional forces exerted on a rail's surface due to surface roughness, as the rail 40 interacts with the wheel of a train. Bulk load may be the external load forces experienced by the rail as the wheels apply rolling contact pressure to the rail 40. Surface pressure 140 in some embodiments may include other types of forces and loads acting on the rail.

In some embodiments, loading events of the simulated loading 130 can be divided into discrete time steps, and a defined load of the loading event can be simulated to travel a distance over the rail 40 in each time step 134, 136, and 138, wherein the defined load is simulated to exert different amounts of pressure 140 across the rail 40 in each time step due to asperity contact between the rail 40 and the wheel of the train car. The surface pressure time history 132 may represent the loads or pressures 140 exerted on the rail 40 at each time period or episode 134, 136, or 138. The surface pressure time history 132 may, for example, be the output of a surface pressure analysis. Surface pressure analysis may predict, determine or define loads (e.g., stresses, shear stresses, pressures, etc.) acting on a surface of a rail 40, an area of contact (e.g., between the rail 40 and the train wheel), and other parameters. Surface pressure time history 132 may, for example, represent a traction load event applied to a rail 40 when the rail 40 is contacted by the train wheel. Surface pressure time history 132 may, for example, be determined or calculated based on one or more loading parameters. Loading parameters can be related to the geometry, physical properties of the rail 40, operating conditions (e.g., environmental conditions, etc.), friction modifier parameters or properties (e.g., rail lubricants, wheel lubricants, other lubricants between the rail 40 and train wheels, rail surface finish, and/or other loading parameters. Loading values, factors or parameters can include in some embodiments a surface roughness profile, lubricant properties, surface velocities, curvatures, transmitted load, and other parameters.

Surface velocities can represent the relative linear or angular velocities of the wheels on the rail 40 during traction loading. Curvatures can represent or define the surface geometry of the rail (rail profiles or updated rail profiles). Transmitted loads may represent the load (e.g., force, pressure, etc.) applied to the rail 40.

The surface pressure time history 132 may be determined or calculated based on one or more loading parameters using numerical methods or other mathematical approaches. In a surface traction analysis, loading parameters (e.g., surface roughness profile, lubricant properties, etc.) may be used to explicitly calculate or determine a detailed solution for pressure and shear stress acting on the surface of the rail 40 and area of contact due to load supported by both lubrication (e.g., a lubrication fluid film) and direct material contact (e.g., asperity contact).

Surface pressure time history 132, which may include bulk loading time history and surface traction time history can be calculated a-priori (e.g., using processor 102), typically utilizing results from a macro-level finite element model of the rail 40. Surface traction time history and bulk loading time history may be used by the system 100 to determine or define boundary conditions on the finite element model for the rail 40. Boundary conditions may be assigned by system 100 (e.g., based on surface traction history, bulk loading time history, and/or other parameters) to constrain nodal degrees of freedom on the boundaries of the representative volume domain. The boundary conditions may also limit the effect that some nodes of the microstructure instance 122 may have on other nodes.

Figure 9:
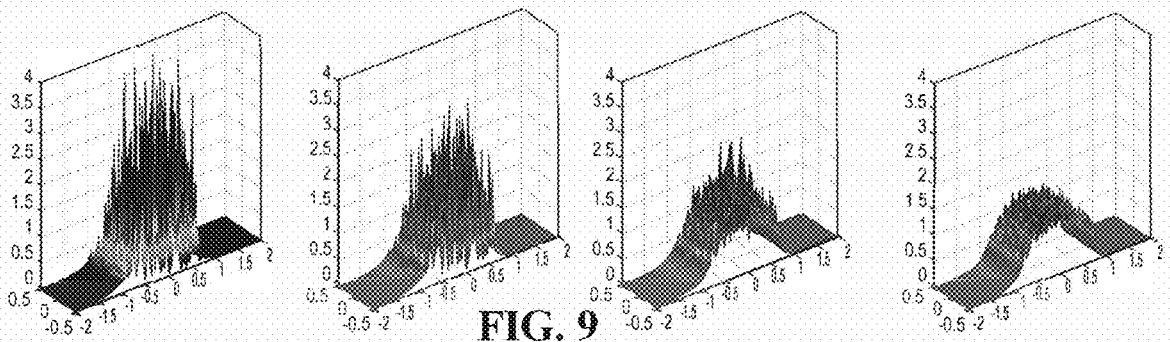
FIG. 9 is a graph of surface pressure profiles on rails having decreasing surface roughness to show the effect of asperity contact between the rail and the train wheel.

FIGS. 6 and 9 demonstrate the effect of asperity contact between the rail 40 and the wheel of a train. Irregularities or increased surface roughness in the surfaces of the rail 40 and/or the train wheel can localized surface pressures to increase as forces and thus pressures are localized to the surface irregularities. In some embodiments, the defined loads of the simulated loading are simulated to exert different amounts of pressure across the rail in each time step due to asperity contact between the rail and the wheel of the train car.

Referring again to FIG. 1, the wear model 14 can include any suitable model for calculating wear, or a volume of material removed from the rail due to forces acting upon the rail by a passing train wheel. In some embodiments, wear can be calculated utilizing the generalized formula below:

$$Q = \frac{KWL}{H} \qquad \text{Eq. 1}$$

In Equation 1, Q is the total volume of wear debris produced, K is a dimensionless constant and can include the coefficient of friction, W is the total normal load applied on the rail, L is the sliding distance or contact area, and H is the hardness of the contact surface. This equation or wear model can in some embodiments be applied to the finite element model of the rail 40 to determine a wear on individual grain structures of the rail such that an overall wear profile 16 can be produced utilizing the wear model 14. The wear profile 16 can be a two-dimensional or three-dimensional wear profile in some embodiments. Any other suitable wear model 14 can be utilized to simulate wear on the rail due to a simulated load on the rail.

The wear model can also take into account friction modifier properties of the rail, which can affect the coefficient of friction for a particular system. If the rail is coated with lubricant for instance, it can reduce the coefficient of friction between the rail and the train wheel thus reducing the wear produced on the rail by the train. Different lubricants can produce different lubrication or friction modifier properties can be factored into the wear model accordingly.

On a first iteration of the wear simulation loop, the original rail profile can be modified by the wear profile 16 produced for the initial predetermined time period in order to produce an updated rail profile 22. The updated rail profile and subsequent updated rail profiles can then be fed back into the contact to multiple to produce subsequent simulated loadings, subsequent wear profiles, and subsequent updated rail profiles until the wear on the rail compared to the original rail profile exceeds a predetermined limit, indicating the end of the wear life for the rail, as shown in FIG. 11.

The methods for calculating wear in a rail of a rail or train track system disclosed herein can be utilized to determine wear life in a rail having a particular rail profile, loading characteristics, friction modifier properties, grinding schedule (artificial wear), material properties etc. as described herein to help more accurately determine when a rail may need to be replaced. The method of predicting wear in the present disclosure can also be utilized to compare different operating conditions in a rail system, including a variation in rail profiles, loading characteristics, friction modifier properties, grinding schedules (artificial wear), material properties, etc. to determine which operating conditions may increase wear life in a rail system.

Wear and Crack Growth Modeling

Figure 15:
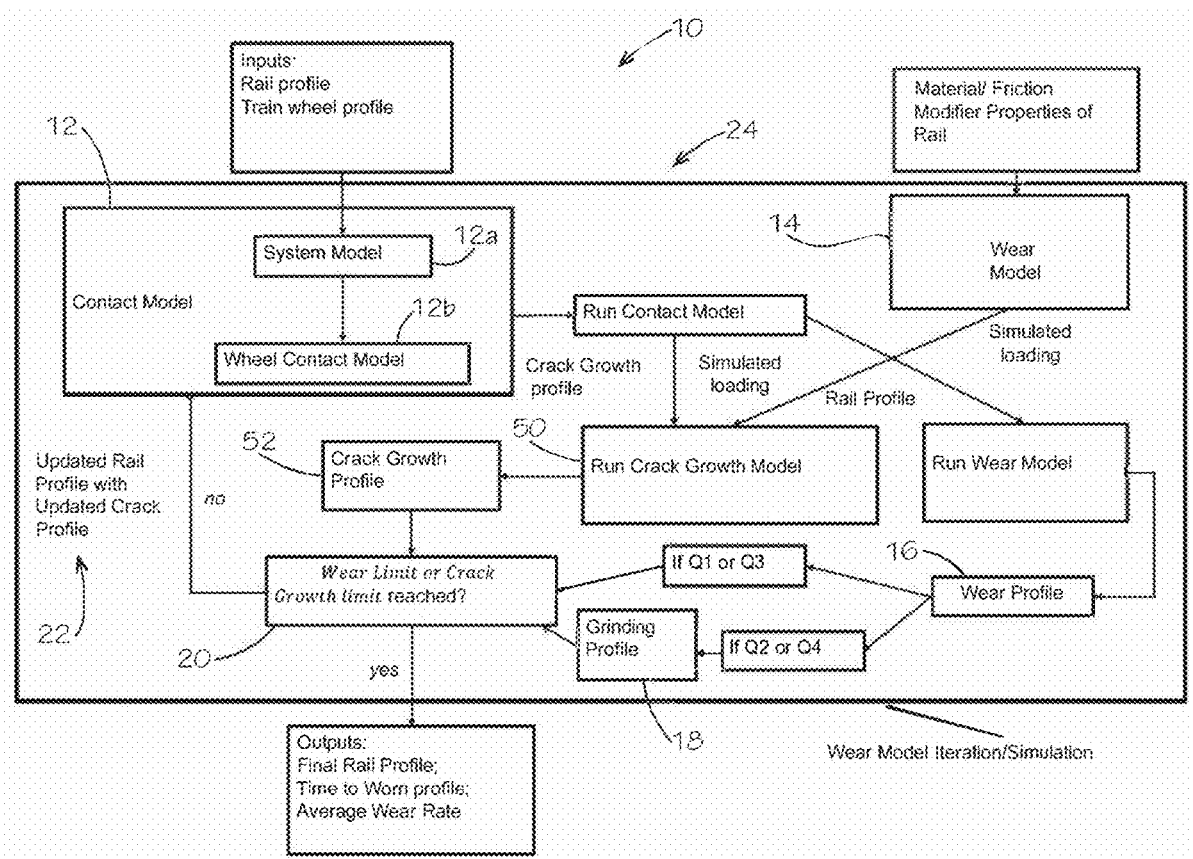
FIG. 15 is a schematic view of an embodiment of a method for prediction wear and crack growth in a rail system.

Another aspect of the present disclosure, as shown in FIGS. 15-16 is a method for modeling wear and crack growth in a rail 40 of a train track due to estimated train traffic. The method can include obtaining material properties of the rail 40, a rail profile 48 of the rail 40, and a train wheel profile of a train car, the rail profile including an initial crack profile; generating a contact model 12 of the interaction between the rail 40 and a wheel of a train based on the rail profile 48, the train wheel profile, and estimated train traffic on the rail; running the contact model 12 to produce a simulated loading on the rail 40 for a predetermined time period using the rail profile; generating a wear model 14 based on the material properties and/or friction modifier properties of the rail 40; running the wear model 14 using the rail profile 48 and the simulated loading from the contact model 12 to produce a simulated wear profile 16 of the rail 40 for the predetermined time period; generating a crack growth model 50 based on the rail profile 48; running the crack growth model 50 using the rail profile 48 and the simulated loading to produce a simulated crack growth profile 52 for the rail profile 48 for the predetermined time period; and generating an updated rail profile 22 with an updated crack profile 56 by modifying the rail profile by the simulated wear profile 16 and the simulated crack growth profile 52.

In some embodiments, the rail 40 may not initially include any cracks such that the crack profile of the rail profile 48 would not include any cracks, and running of the crack growth model 50 will determine whether one or more cracks 54 will form or be initiated in the rail 40 during the predetermined time period, and if so how deep those cracks 54 may get. If no crack formation is predicted during the predetermined time period, the simulated crack growth profile 52 can additionally not include any cracks, and thus the rail profile 48 would only be modified by wear via the wear profile 16 on the rail 40, and not crack growth, and the updated rail profile 22 and the updated crack profile would not include any cracks.

Figure 16A:
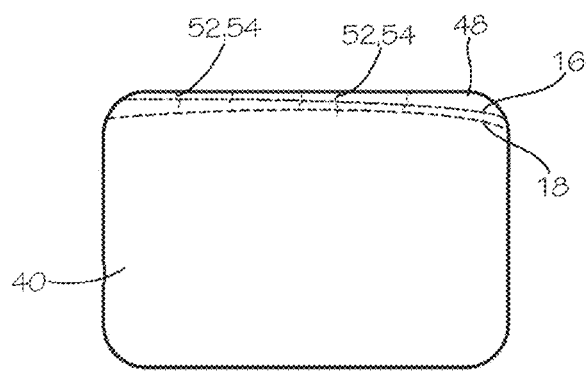
FIG. 16a is a schematic view of an exemplary initial rail profile, a wear profile, a crack growth profile, and a grinding profile associated with an iteration of a wear simulation of the present disclosure.
Figure 16B:
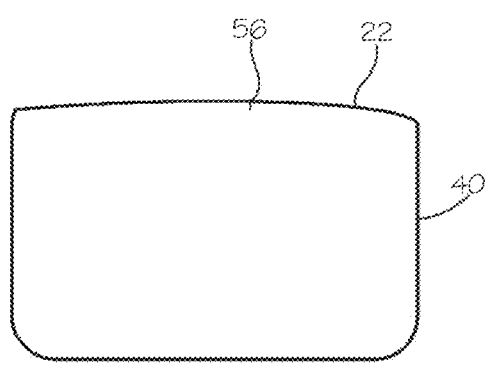
FIG. 16b is a schematic view of an updated rail profile created by modifying the initial rail profile by the wear profile the crack growth profile, and the grinding profile.
Figure 16C:
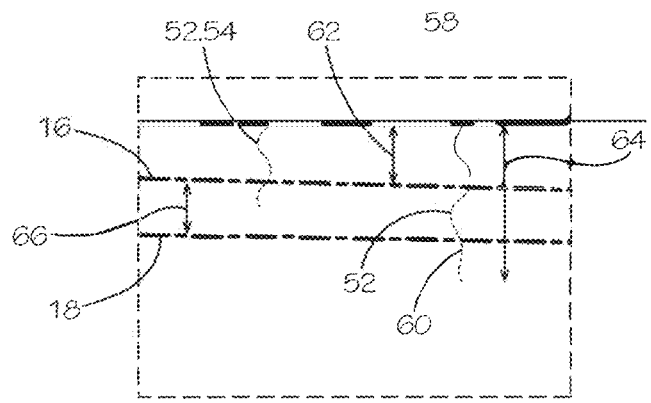
FIG. 16c is a detailed view of the schematic diagram of FIG. 16a showing an average wear depth, maximum crack growth depth, and average grinding depth produced from an iteration of an exemplary wear simulation of the present disclosure.
Figure 20:
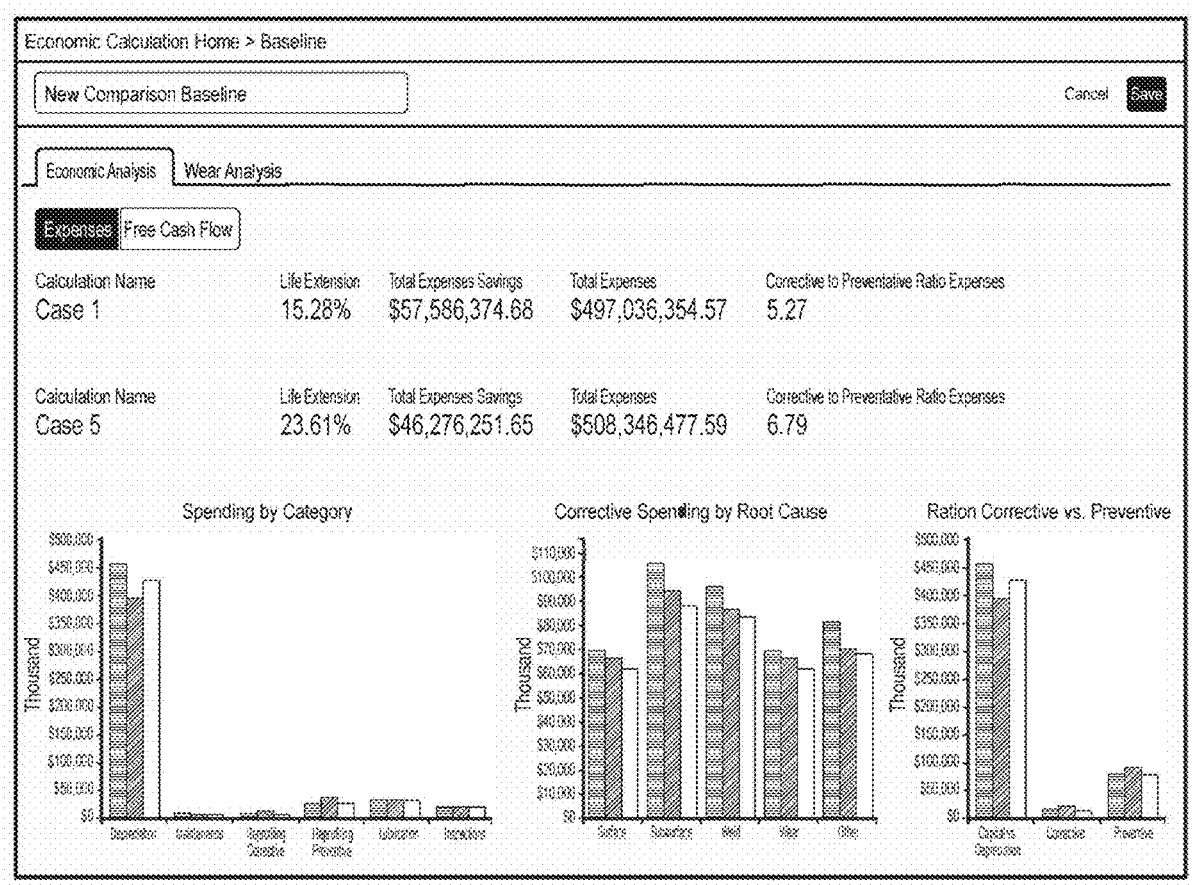
FIG. 20 is a picture of an output of a financial modeling simulation performed using two sets of maintenance parameters, the output showing life extensions and costs savings values associated with the different sets of maintenance parameters.

In other embodiments, the crack growth model 50 may indicate formation of cracks 54 in the rail profile 48 during the predetermined time period, such that the simulated crack growth profile 52 may include the formed or initiated one or more cracks 54. In some iterations of the wear simulation 24, any wear experienced in the rail 40 may remove some or all of the one or more cracks 54 formed in the rail 40 during the predetermined time period. In other iterations, the crack growth may outpace the wear in the rail 40, such that an updated rail profile 22 accounting for both the simulated wear profile 16 and the crack growth profile 52 may include small left over cracks, such that an updated crack profile 56 in the updated rail profile 22 includes one or more cracks. As shown in FIGS. 16*a*-16*c*, the simulated crack growth profile 52 would include fromed cracks 54 extending from the rail profile 48 into the rail 40.

In still other embodiments, an initial rail profile 48 may include an initial crack profile 58, and the crack growth model 52 can calculate the formation of any new cracks 54 and the additional crack growth 60 or propagation of the initial crack profile 58, and the simulated crack growth profile 52 can include both new cracks 54 and the growth 60 of the initial crack profile 58, as shown in FIG. 16*c*.

Referring again to FIGS. 15-16, in some embodiments, the method can further include performing a wear simulation 24 by repeating or performing iteratively with the updated rail profile 22 with the updated crack profile 52 and subsequent updated rail profiles with subsequent updated crack profiles for corresponding subsequent predetermined time periods the following steps: running the contact model 12 to produce a subsequent simulated loading; running the wear model 14 to produce a subsequent simulated wear profile based on the subsequent simulated loading; running the crack growth model 50 to produce a subsequent simulated crack growth profile; and generating the subsequent updated rail profile with the subsequent updated crack profile by modifying an immediately prior updated rail profile by the subsequent simulated wear profile and the subsequent simulated crack growth profile; wherein the method is completed when a final subsequent rail profile exceeds a predetermined wear limit for the rail or a final updated crack profile exceeds a predetermined crack growth fail limit. As such, a wear and crack growth simulation 24 can be run on a rail profile 48 to model both wear and crack growth over time and determine when a rail 40 will either reach a wear fail limit or a crack growth fail limit and need to be replaced.

It can be beneficial to model both wear and crack growth on a rail simultaneously. While crack growth can be modelled over time to show the growth or expansion of a crack or defect in the rail, wear from the train can reduce the general depth of crack growth similar to the way wear can reduce the depth of the rail generally. As such, wear can slow down crack growth in some circumstances. In other circumstances given the orientation or angle of the crack, wear can exacerbate crack growth. As such, a crack growth prediction method that does not account for wear may not be sufficient to accurately predict rail failure due to crack growth, which can either cause a rail to be replaced prematurely or not be replaced when necessary to maintain safe operating conditions.

In some embodiments, propagation of an existing crack can be modelled by the following generalized differential equation:

$$\frac{da}{dN} = f(\Delta\sigma, a, C_i),\qquad\text{Eq. 2}$$

Wherein the crack length is denoted as a, the number of cycles is given by N, the stress range by $\Delta\sigma$, and the material parameters by $C_i$. In some embodiments, any suitable different equation for the crack growth model 50 can be utilized, including but not limited to one or more of the Paris Erdogan equation, the Forman equation, the McEvily-Groeger equation, the NASGRO equation, the McClintock equation, the Walker equation, or the Elber equation. In some embodiments, calculation and prediction of the formation of cracks 54 in the rail 40 and the growth of those cracks over time via the crack growth model 50 can utilize the methods taught in U.S. Pat. No. 10,474,772, which is incorporated herein by reference in its entirety.

In some embodiments, the method can further include obtaining a grinding profile 18 for at least one grinding operation performed on the rail 40 during the predetermined time period; and generating the updated rail profile 22 by modifying the rail profile 48 by the wear profile 16, the crack growth profile 52, and the grinding profile 18. FIGS. 16a-16c shows an initial rail profile 48 with an initial crack profile 58. As such, the updated rail profile 22 can be produced by overlaying the crack growth profile 52 and the wear profile 16 onto the rail profile 48. Grinding operations can further reduce rail material around the crack and reduce the amount of crack growth, or remove material around local crack growth in a predetermined time period. As shown in FIGS. 16a-16c, the rail profile 48 can be modified by the crack growth profile 52 during the predetermined time period, which can be mitigated by the wear profile 16 in the rail and the further grinding of the rail 40, represented by the grinding profile 18 during the predetermined time period to produce an updated rail profile 22 with an updated crack profile 56.

In some embodiments, grinding operations can be designed to completely remove all formed cracks in the rail in a predetermined time period to slow crack growth as much as possible. In other embodiments, grinding operations can be designed to remove only a portion of the crack growth not removed by natural wear. Grinding produces artificial wear in the rail 40 that can reduce the wear life of the rail. As such, in some embodiments, grinding may be designed to remove a minimum amount of crack growth so that the rail 40 does not proceed to crack growth failure, or so the rail keeps an acceptable amount of cracks and/or crack growth in the rail 40 over time. As such, both wear life and crack growth failure life can be optimized. The method of modeling wear and crack growth with additive grinding can help a rail operator model various operating scenarios to determine the optimum conditions to optimize wear as well as crack failure life.

In some embodiments, for each iteration, the method can include regenerating the contact model 12 of the interaction between the rail and a train based on the updated rail profile 22 including the updated crack profile 56, as well as subsequent updated rail profiles corresponding subsequent updated crack profiles, the train wheel profile, and estimated train traffic on the rail. Regenerating the contact model 12 during each iteration can help provide a more accurate simulation of loads on the rail and as the rail profile and the crack profile change over time. In some embodiments, the method can further include generating a plot of the rail profile with the crack profile, the updated rail profile with the updated crack profile, and subsequent updated rail profiles with the subsequent updated crack profiles over time.

In some embodiments, the wear profile 16 can include an average wear depth 62, and the crack growth profile can include a maximum crack growth depth 64, and the method further comprises calculating a recommended grinding profile having an average grinding depth 66 substantially equal to the difference between the maximum crack growth depth 64 and the wear depth 62. As such, grinding can generally be incorporated into the rail maintenance operations to remove any cracks formed in the rail over time to help slow any crack propagation in the rail 40.

In some embodiments, as the contact model, the wear model, and the crack growth model are all physics-based models. The physics based models for each of these components has been discussed previously herein.

The crack growth modeling aspects of the present disclosure can also be incorporated into the computer system 100 discussed previously herein and as shown in FIG. 21. The input device 108 can further be operable to receive a rail profile including a crack profile. The computer readable instructions executed by the processor 102 can further be configured to generate a crack growth model based on the rail profile; running the crack growth model using the rail profile and the simulated loading to produce a simulated crack growth profile of the rail for the predetermined time period; and generating an updated rail profile by modifying the rail profile by the wear profile and the crack growth profile.

In some embodiments, the input device 108 can be operable to receive a grinding profile of at least one grinding operation to be performed during the predetermined time period; and predicting wear via the computer system 100 can further include generating the updated rail profile by modifying the rail profile by the wear profile, the crack growth profile, and the grinding profile.

In some embodiments, the updated rail profile includes an updated crack profile, and the computer readable instructions cause the processor 102 to repeat iteratively with the updated rail profile with the updated crack profile and subsequent updated rail profiles with subsequent updated crack profiles for corresponding subsequent predetermined time periods the following steps: running the contact model to produce a subsequent simulated loading; running the wear model to produce a subsequent simulated wear profile based on the subsequent simulated loading; running the crack growth model to produce a subsequent simulated crack growth profile; and generating the subsequent updated rail profile with the subsequent updated crack profile by modifying an immediately prior updated rail profile by the subsequent simulated wear profile and the subsequent simulated crack growth profile; wherein the method is completed when a final subsequent rail profile exceeds a predetermined wear limit for the rail or the crack profile exceeds a predetermined crack growth fail limit.

Financial Modeling

Another aspect of the present disclosure is a financial modeling that can help train operators make maintenance decisions for a rail system based on a financial economic analysis associated with different maintenance protocols or operating scenarios. A method for modeling wear in a rail of a train track due to estimated train traffic in order to provide maintenance recommendations for the train track, the method including the steps of obtaining a train wheel profile of a train car; providing two or more sets of maintenance parameters, each set of maintenance parameters including: rail profile; grinding parameters; and rail material properties; wherein at least one pair of corresponding maintenance parameters in the two or more sets of maintenance parameters is different from one another. For each of the at least two sets of maintenance parameters, the method can include: generating a contact model of an interaction between the rail profile and a wheel of a train based on the rail profile, the train wheel profile, and estimated train traffic on the rail; and generating a wear model based on the material properties. The method can include performing a wear simulation using the rail profile for a predetermined time period by: running the contact model to produce a simulated loading; running the wear model to produce a simulated wear profile based on the simulated loading; and generating an updated rail profile by modifying the rail profile by the simulated wear profile. The wear simulation can be repeated iteratively using the updated rail profile and subsequent updated rail profiles until a final updated rail profile exceeds a predetermined wear limit for the rail. The method can include calculating a wear time until the final rail profile exceeds the predetermined wear limit, and comparing a cost value for each set of maintenance parameters, the cost value based on maintenance costs associated with the corresponding set of maintenance parameters. The method can further include recommending or selecting the set of maintenance parameters having the lower cost value. The contact model and wear model can be similar to those contact and wear models discussed previously herein.

The cost value associated with each set of maintenance parameters can include capital costs, depreciation (inversely proportional to wear or rail life of the rail), and maintenance costs. Depreciation can be closely tied to the cost savings associated with prolonging the replacement of an existing rail with a new rail. Longer wear or rail life of the rail can help extend the time period before a rail line needs to be replaced, which can thus spread out the depreciation costs or the rail due to wear and other damage over a longer period of time and reduce an annual depreciation of the rail. Varying different maintenance parameters can affect either the capital costs, depreciation, or maintenance costs as discussed in more detail herein.

Figure 17:
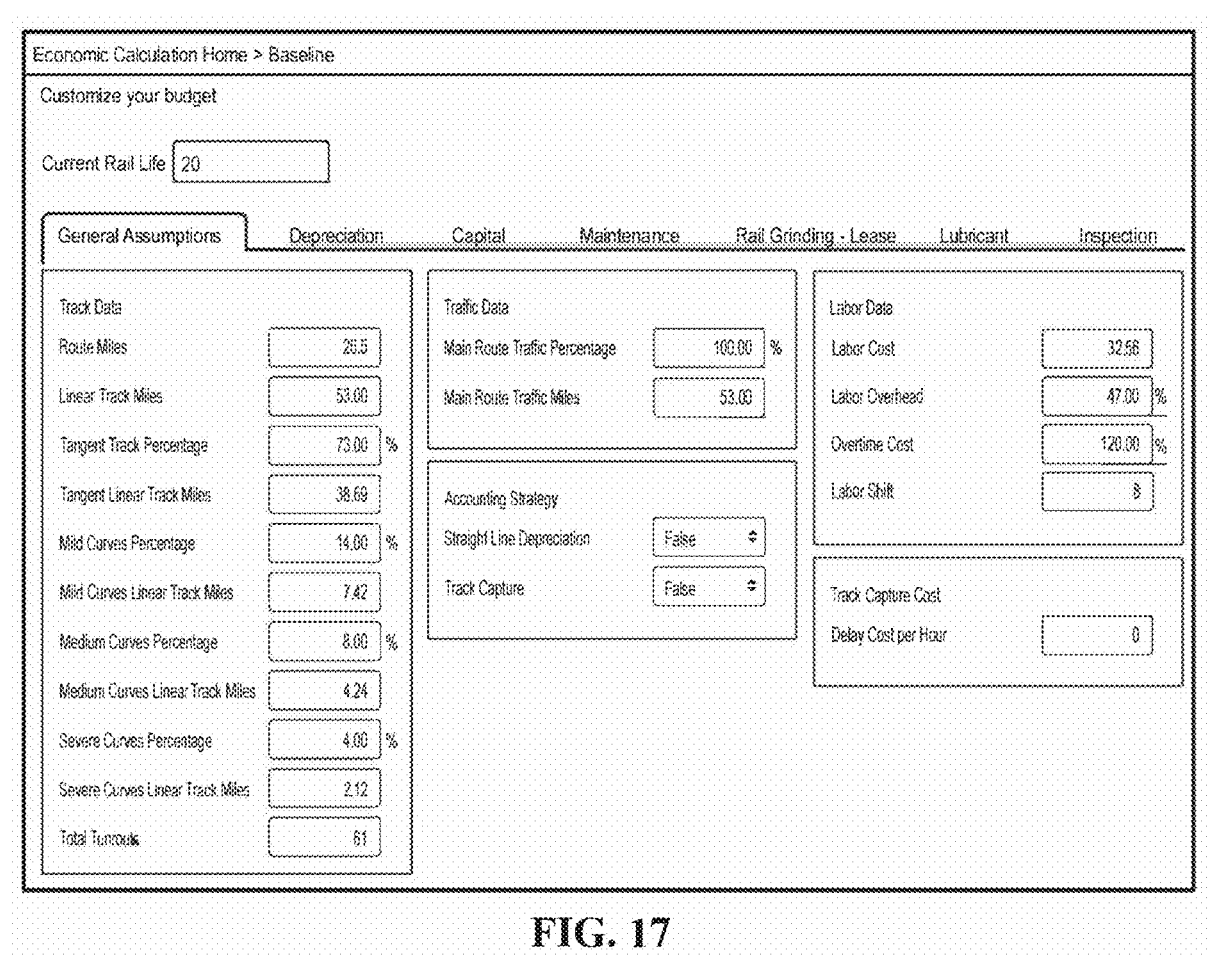

In some embodiments, as shown in FIG. 17, the financial model can include an analysis of a desired segment of the train track or a certain number of miles of a train track, and the at least two sets of maintenance parameters can each include percentages of the train track that are: straight track segments; mild curved track segments; and severe curve track segments. Capital costs and wear rates can vary depending on whether track segments are straight, mildly curved, or severely curved.

In some embodiments, the grinding parameters can include a grinding profile for a desired grinding operation performed during one or more iterations of the wear simulation; and the method can further include, for the one or more iterations of the wear simulation where grinding is performed, generating the updated rail profile by modifying the rail profile or an immediately prior updated rail profile by the simulated wear profile and the grinding profile.

In some embodiments, as shown in FIG. 18, the grinding parameters can include one or more of: a grinding frequency (or the number of overall grinding operations), a grinding speed; a grinding depth; or a number of grinding passes in each grinding operation. The grinding or reprofiling speed can be inversely proportional to the grinding depth created in a grinding pass, as a slower speed of a grinding machine can cause more material to be removed as the grinding machine proceeds down the rail. In many grinding machines, the angle of the grinder can be adjusted, such that multiple grinding passes can be performed with the grinding machine at different angles so that the grinding machine may be able to more closely match or conform to the shape of a reprofiled rail, or the updated rail profile, to a desired or optimal rail profile. The number of corrective grinding passes shown in FIG. 18 can be proportional to the conformity of the updated rail profile to a desired rail profile. Conformity to a desired rail profile can help optimize wear life in a rail system, and thus decrease annual depreciation of the rail across the usable life of the rail. Total grinding costs, including associated rental, labor cost, and potential train track downtime costs associated with the grinding parameters, can also increase proportionally to the number of grinding passes, and inversely to the speed and thus the depth of each grinding pass. As such, while changing certain grinding parameters can help increase wear life, and thus decrease annual depreciation and capital replacement costs of the rail, savings associated with increased wear or rail life can be balanced or offset via the financial model. Inversely, reducing grinding operations may decrease grinding maintenance costs but may reduce wear life and thus increase annual depreciation.

Similarly, capital costs can include the costs of the rail materials and manufacturing of the rails. Some materials may have greater resistance to wear, and thus increase wear life, but thus stronger materials may be more expensive to purchase, so the increase in capital costs may outweigh the savings associated with longer wear life, or vice versa.

Figure 19:
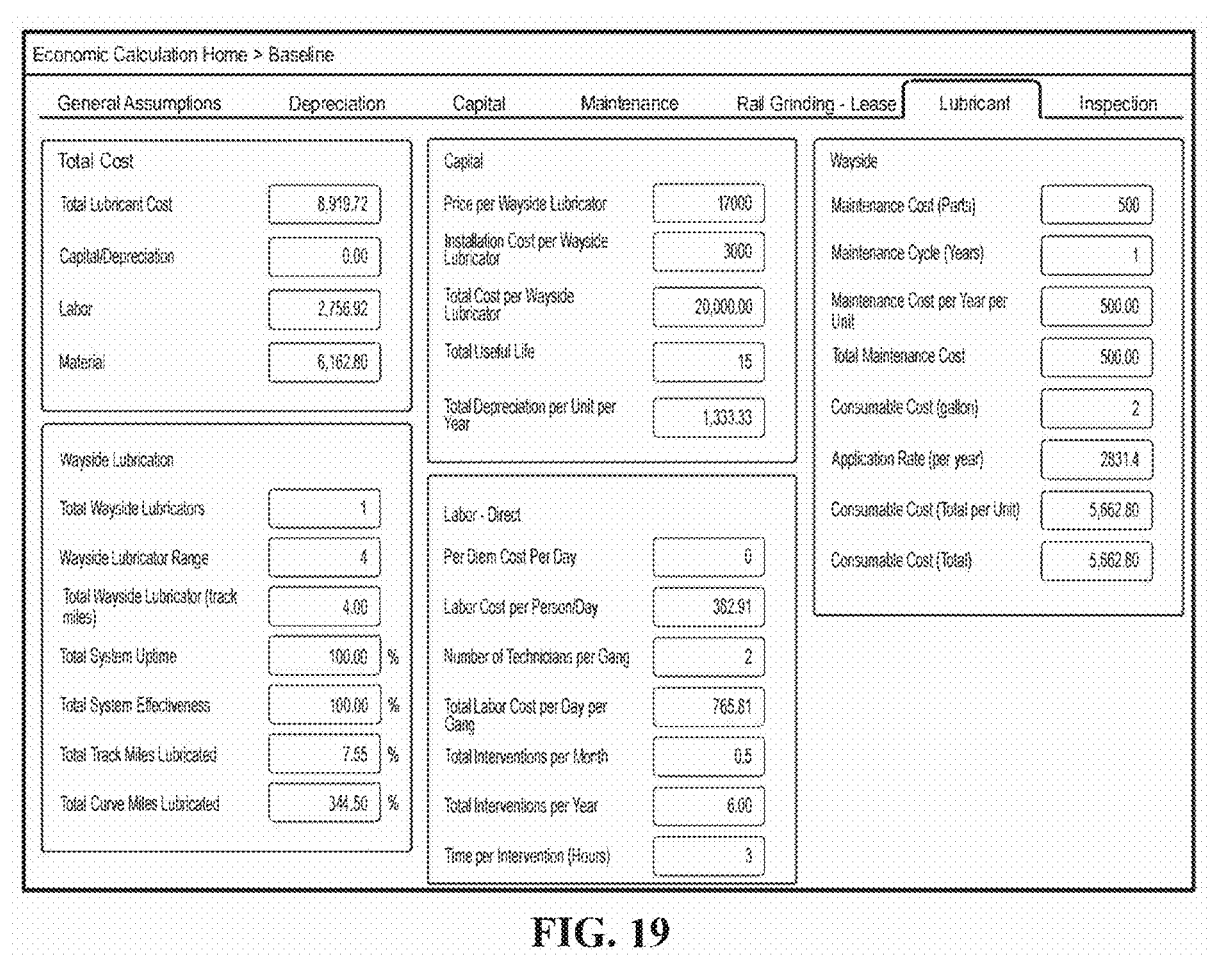

As seen in FIG. 19, in some embodiments, each set of maintenance parameters also includes friction modifier parameters. In some embodiments, the friction modifier parameters can include a distance between friction modifier applicators on the train track; a number of friction modifier applicators; the uptime of friction management applications; the effectiveness of friction management applicator, or friction modifier material properties. As noted previously herein, friction modifiers such as lubricants can help reduce wear between the rail and the train wheel, which can thus increase wear life. Thus, the wear model can be based off of material properties of the rail and/or lubrication properties of the rail. The greater the distance between friction modifier applicators on the rail, the lower the uptime of the friction management applicators, or the lower effectiveness of friction management applicators, resulting in a higher risk that the friction modifier is not applied to the entire rail, which can increase the wear on the rail. The number of friction modifier applicators and the particular friction modifier or lubrication properties of friction modifiers can also affect the degree to which the friction modifier(s) can reduce wear and increase wear life of the rail. However, the friction modifier stations can increase maintenance costs, and the costs savings associated with increased wear life can be offset or balanced by the increased cost of more frequent lubrication stations.

In some embodiments, the financial modeling method disclosed herein can include welded train tracks, and the at least two sets of maintenance parameters each include welding parameters. Welding parameters can affect operating expenses the rail during its life cycle.

In some embodiments, the method can further include modeling crack growth as well as wear in the rail over time and accounting for such crack growth in the financial analysis. In such embodiments, in each set of maintenance parameters, the rail profile can include a crack profile, and for each set of the at least two sets of maintenance parameters, the method further includes generating a crack growth model based on the rail profile and the crack profile, and the wear simulation further includes running the crack growth model using the rail profile, the crack profile and the simulated loading to produce a simulated crack growth profile for the predetermined time period; and generating an updated rail profile with an updated crack profile by modifying the rail profile by the simulated wear profile and the crack growth profile, repeating the wear simulation iteratively using the updated rail profile and subsequent updated rail profiles until a final updated rail profile exceeds a predetermined wear limit for the rail or the updated crack profile exceeds a predetermined crack growth fail limit; and calculating a wear time until the final rail profile exceeds the predetermined wear limit or the updated crack profile exceeds a predetermined crack growth fail limit.

Figure 21:
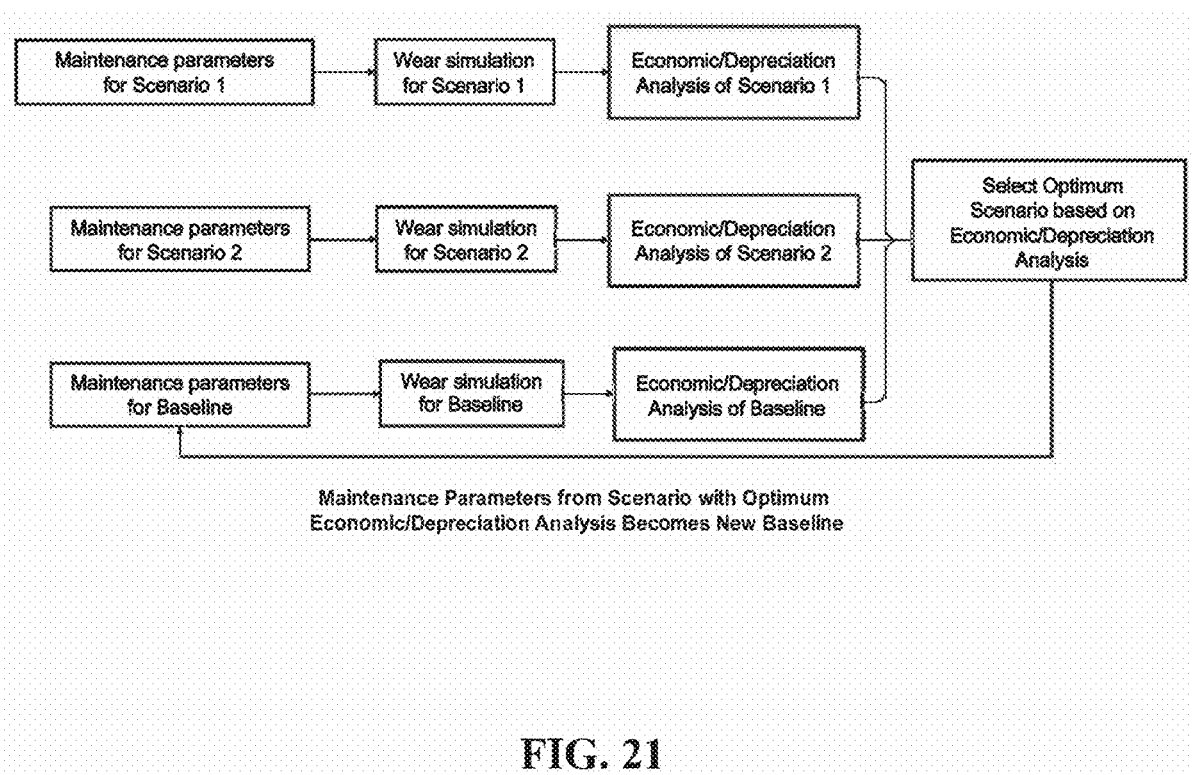
FIG. 21 is a schematic diagram of a financial modeling method that can be used to compare and optimize different maintenance programs for a rail.
Figure 22:
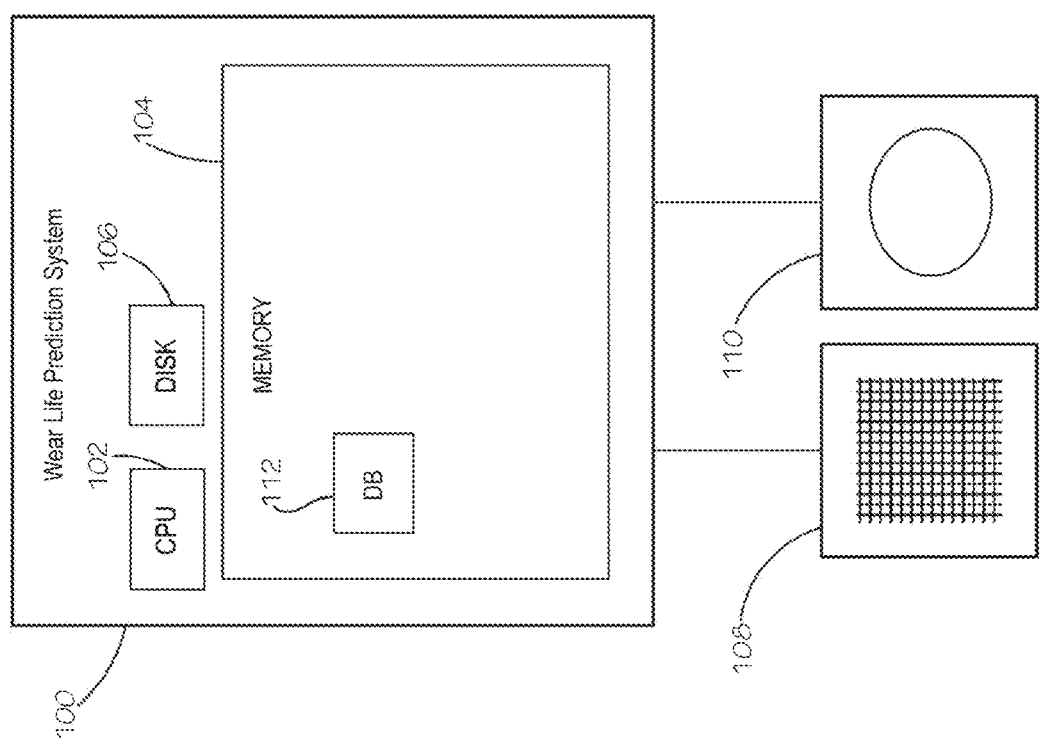
FIG. 22 is a schematic diagram of a computer system which can be utilized to implement the various wear, crack growth and financial modeling methods of the present disclosure.

In some embodiments, the financial modeling method discussed herein can be implemented on the computer system 100 described herein and shown in FIG. 21. The method can further include configuring a computer-based system 100 to predict and compare wear or rail life in the rail of the train track and provide cost value estimates associated with at least two sets of maintenance parameters, the computer-based system 100 including an input device 108 operable to receive a train wheel profile and the at least two sets of maintenance parameters; an output device 110 operable to convey wear and cost value information relating to the rail; memory 104 operable to store a train wheel profile of a wheel of a train car and the at least two sets of maintenance parameters, and computer-executable instructions including wear prediction processes; and a processor 102. The method can include predicting and comparing wear and rail life scenarios in the rail for each of the at least two sets of maintenance parameters with the computer-based system 100 according to the wear prediction processes of the computer-executable instructions, wherein the computer-executable instructions cause the processor 102 to predict wear in the rail by: generating a contact model of an interaction between the rail profile and a wheel of a train based on the rail profile, the train wheel profile, and estimated train traffic on the rail; and generating a wear model based on the material properties. The computer system 100 and the processor 102 can iteratively perform the various wear simulations discussed herein for each set of maintenance parameters until a final updated rail profile exceeds a predetermined wear limit for the rail or a crack growth profile exceeds a crack growth limit. The computer based system can then calculate a wear time until the final rail profile exceeds the predetermined wear limit; and calculate via the processor a cost value for each set of maintenance parameters, the cost value based on maintenance costs associated with the corresponding set of maintenance parameter.

As shown in FIG. 21, the output device 110 can include a user interface which can be operable to display one or more graphs of the cost values for each set of maintenance parameters, as well as provide a cost savings calculation between the at least two sets of maintenance parameters. As such once wear and/or crack growth simulations are performed for each set of maintenance parameters and calculate cost values for the same, the output device 110 can display such information in a format such that the user can readily compare the results of the executed simulations and costs analysis.

While wear and crack growth simulations alone can be utilized to help maximize or optimize wear life or crack growth failure life, often times the value saved by extended the life of the rail may not justify the higher costs associated with achieving that rail life extension. A financial model can help a rail operator account for and optimize maintenance parameters to achieve the optimal balance of rail life extension and maintenance costs which provide the largest overall economic savings to the rail operator.

Thus, although there have been described particular embodiments of the present invention of a new and useful METHOD OF PREDICTING WEAR IN A RAIL SYSTEM, it is not intended that such references be construed as limitations upon the scope of this invention.

What is claimed is:

1. A method for maintaining a train track, the method comprising:

modeling a plurality of predicted rail profiles of a rail based on a plurality of sets of maintenance parameters, each set of the plurality of sets of maintenance parameters associated with a respective predicted rail profile of the plurality of predicted rail profiles, each set of the plurality of sets of maintenance parameters includes different maintenance parameters, the maintenance parameters including at least one of a grinding profile for at least one grinding operation to be performed on the rail to produce artificial wear or an application of a friction modifier to be applied to the rail, wherein modeling each of the plurality of predicted rail profiles comprises:

modeling wear in the rail due to estimated train traffic and the set of maintenance parameters over an initial predetermined time period by:

obtaining material properties of the rail, a rail profile of the rail, and a train wheel profile of a wheel of a train car;

generating a contact model of the interaction between the rail and the train car based on the rail profile, the train wheel profile, and the estimated train traffic on the rail during the predetermined time period;

running the contact model to produce a simulated loading on the rail for the predetermined time period using the rail profile, wherein the simulated loading represents a passage of the wheel of the train car;

generating a wear model based on the material properties and/or properties of the friction modifier on the rail during the predetermined time;

running the wear model using the rail profile and the simulated loading from the contact model to produce a simulated wear profile of the rail for the predetermined time period, wherein the simulated wear profile represents the rail of the train track; and generating an updated rail profile by modifying the rail profile by the simulated wear profile and the grinding profile; and determining whether the updated rail profile exceeds a predetermined wear limit for the rail; and iteratively modeling wear in the rail over subsequent predetermined time periods until the updated rail profile exceeds a predetermined wear limit for the rail by:

running the contact model to produce a subsequent simulated loading;
running the wear model to produce a subsequent simulated wear profile based on the subsequent simulated loading; and
generating a subsequent updated rail profile by modifying the prior updated rail profile by the subsequent simulated wear profile and/or a subsequent grinding profile; and
calculating a wear time until the final updated rail profile exceeds the predetermined wear limit;
determining the predicted rail profile having the longest wear time; and
maintaining the rail for at least the initial predetermined time period in accordance with the set of maintenance parameters associated with the predicted rail profile having the longest wear time.

2. The method of claim 1, wherein the at least one set of the plurality of sets of maintenance parameters includes a first grinding protocol and a second grinding protocol, the first grinding protocol including a first grinding operation performed on the rail during the initial predetermined time period, the second grinding profile including a second grinding operation performed on the rail during a subsequent predetermined time period, and further comprising generating a second updated rail profile of the subsequent updated rail profiles by modifying the updated rail profile by a second simulated wear profile of the subsequent wear profiles and the second grinding profile.

3. The method of claim 1, wherein the contact model further includes a system model of force and pressure profiles between multiple sets of wheels of the train car and the train track and a wheel contact model of rolling contact forces between the wheel of the train car and the rail.

4. The method of claim 1, wherein the simulated loading is divided into discrete time steps, and a defined load is simulated to travel a distance over the rail in each time step, wherein the defined load is simulated to exert different amounts of pressure across the rail in each time step due to asperity contact between the rail and the wheel of the train car.

5. The method of claim 1, wherein the simulated wear profile includes a wear depth profile and generating the updated rail profile includes subtracting the wear depth profile from the rail profile.

6. The method of claim 1, wherein generating the contact model includes generating a finite element model based on the material properties of the rail, wherein the finite element model includes a plurality of elements corresponding to portions of a grain structure of the rail and represents polycrystalline properties of the rail, and wherein generating the finite element model includes generating a random microstructure instance using a tessellation and meshing the random microstructure instance with a convex polygon; and
each element of the plurality of elements includes one or more functions defining a behavior of the material properties of the rail, the material properties including a brittleness of the rail of the train track.

7. The method of claim 1, further comprising generating, for each of the plurality of predicted rail profiles, a plot of the rail profile, updated rail profile, and subsequent updated rail profiles over time.

8. The method of claim 1, further comprising, for each iteration, regenerating the contact model of the interaction between the rail and a train based on the updated rail profile or the subsequent updated rail profile, the train wheel profile, and estimated train traffic on the rail during the subsequent predetermined time period.

9. The method of claim 1, further comprising, for each iteration, regenerating the wear model based on the material properties and properties of the friction modifier on the rail during the subsequent predetermined time period.

10. The method of claim 9, wherein the rail profile includes a crack profile representing one or more cracks in the rail of the train track, and further comprising:
generating a crack growth model based on the rail profile and the crack profile;
running the crack growth model using the rail profile, the crack profile, and the simulated loading to produce a simulated crack growth profile of the rail profile for the predetermined time period, wherein the simulated crack growth profile represents one or more formed or initiated cracks in the rail of the train track; and
generating the updated rail profile with an updated crack profile by modifying the rail profile by the simulated wear profile, the grinding profile, and the simulated crack growth profile.

11. The method of claim 10, further comprising repeating iteratively with the updated rail profile with the updated crack profile and subsequent updated rail profiles with subsequent updated crack profiles for corresponding subsequent predetermined time periods the following steps:
running the contact model to produce a subsequent simulated loading;
running the wear model to produce a subsequent simulated wear profile based on the subsequent simulated loading;
running the crack growth model to produce a subsequent simulated crack growth profile; and
generating the subsequent updated rail profile with the subsequent updated crack profile by modifying an immediately prior updated rail profile by the subsequent simulated wear profile and the subsequent simulated crack growth profile;
wherein the step of modeling wear in the rail is completed when a final subsequent updated rail profile exceeds a predetermined wear limit for the rail or a final subsequent updated crack profile exceeds a predetermined crack growth fail limit.

12. The method of claim 10, wherein the updated rail profile is produced by overlaying the simulated crack growth profile and the simulated wear profile onto the rail profile.

13. The method of claim 12, wherein the simulated wear profile includes an average wear depth, and the simulated crack growth profile includes a maximum crack growth depth, and the method further comprises calculating a recommended grinding profile having an average grinding depth substantially equal to the difference between the maximum crack growth depth and the average wear depth.

14. The method of claim 1, wherein the application of a friction modifier to be applied to the rail includes a distance between friction modifier applicators on the rail.

15. A method for maintaining a train track, the method comprising:
modeling wear in a rail of a train track due to an estimated train traffic by:
obtaining a train wheel profile of a train car;
providing two or more sets of maintenance parameters, each set of maintenance parameters including:
a rail profile;
grinding parameters; and
rail material properties;

wherein at least one pair of corresponding maintenance parameters in the two or more sets of maintenance parameters is different from one another;

for each of the two or more sets of maintenance parameters:
generating a contact model of an interaction between the rail profile and a wheel of a train based on the rail profile, the train wheel profile, and estimated train traffic on the rail;
generating a wear model based on the material properties;
performing a wear simulation using the rail profile for a predetermined time period of one month or less by:
running the contact model to produce a simulated loading;
running the wear model to produce a simulated wear profile based on the simulated loading; and
generating an updated rail profile by modifying the rail profile by the simulated wear profile and the grinding parameters;
repeating the wear simulation iteratively for additional predetermined time periods using the updated rail profile and subsequent updated rail profiles until a final updated rail profile exceeds a predetermined wear limit for the rail; and
calculating a wear time until the final updated rail profile exceeds the predetermined wear limit, wherein the wear time is at least one year; and
comparing the wear times associated with each set of maintenance parameters;

generating a maintenance recommendation based on the wear times associated with each set of maintenance parameters, wherein generating the maintenance recommendation includes either i) comparing a cost value over the wear time for each set of maintenance parameters, the cost value based on maintenance costs associated with the corresponding set of maintenance parameters, and selecting a set of maintenance parameters having a lower cost value, or ii) selecting a set of maintenance parameters having the longest wear time; and grinding the rail according to the grinding parameters of the maintenance recommendation.

16. The method of claim 15, wherein generating the maintenance recommendation includes selecting the set of maintenance parameters having the lower cost value.

17. The method of claim 15, wherein generating the maintenance recommendation includes selecting the set of maintenance parameters having the longest wear time.

18. A method for maintaining a train track, the method comprising:
modeling wear in a rail of a train track due to an estimated train traffic by:
configuring a computer-based system to predict wear in the rail of the train track, the computer-based system comprising:
an input device operable to receive material properties of the rail, a rail profile of the rail, and a set of maintenance parameters, including at least one of a grinding profile for at least one grinding operation to be performed on the rail to produce artificial wear or an application of a friction modifier to be applied to the rail;
an output device operable to convey wear information relating to the rail;
memory operable to store the material properties of the rail, the rail profile of the rail, a train wheel profile of a wheel of a train car, and computer-executable instructions including wear prediction processes; and
a processor;
predicting wear in the rail with the computer-based system according to the wear prediction processes of the computer-executable instructions, wherein the computer-executable instructions cause the processor to predict wear in the rail by:
generating a contact model of the interaction between the rail and the train car based on the rail profile, the train wheel profile, and the estimated train traffic on the rail;
running the contact model to produce a simulated loading on the rail for a predetermined time period using the rail profile;
generating a wear model based on the material properties and/or properties of the friction modifier on the rail during the predetermined time;
running the wear model using the rail profile and the simulated loading from the contact model to produce a simulated wear profile of the rail for the predetermined time period;
generating an updated rail profile by modifying the rail profile by the simulated wear profile and/or the grinding profile, wherein the computer-executable instructions cause the processor to repeat iteratively with the updated rail profile and subsequent updated rail profiles for corresponding subsequent predetermined time periods the following steps until a final subsequent updated rail profile exceeds a predetermined wear limit for the rail:
running the contact model to produce a subsequent simulated loading, wherein the predetermined time period of the contact model is one month or less;
running the wear model to produce a subsequent simulated wear profile based on the subsequent simulated loading, wherein the predetermined time period of the wear model is one month or less; and
generating the subsequent updated rail profile by modifying the prior updated rail profile by the subsequent simulated wear profile and the grinding profile; and
calculating a wear time until the final subsequent updated rail profile is reached, wherein the wear time is at least one year;
wherein predicting wear in the rail includes calculating a corresponding wear time for each of a plurality of sets of maintenance parameters, the plurality of sets of maintenance parameters including a first set of maintenance parameters and a second set of maintenance parameters, a first wear time corresponding to the wear time until the final subsequent updated rail profile is reached based on the first set of maintenance parameters and a second wear time corresponding to the wear time until the final subsequent updated rail profile is reached based on the second set of maintenance parameters; and maintenance-parameters-maintaining the rail according to one of the first set of maintenance parameters or the second set of maintenance parameters having the longest wear time.

19. The method of claim 18, wherein the input device is operable to receive the train wheel profile of the wheel of the train car and the estimated train traffic for the rail.

20. The method of claim 19, further comprising:
generating and displaying with the output device a plot of the rail profile, the updated rail profile, and any subsequent updated rail profiles over time.

* * * * *

UNITED STATES PATENT AND TRADEMARK OFFICE
CERTIFICATE OF CORRECTION

PATENT NO. : 11,893,322 B2
APPLICATION NO. : 16/986800
DATED : February 6, 2024
INVENTOR(S) : Ankur Ashtekar et al.

It is certified that error appears in the above-identified patent and that said Letters Patent is hereby corrected as shown below:

In the Claims

Column 25, Line 1, reads, "maintenance-parameters-maintaining the rail according to" which should read "maintaining the rail according to..."

Signed and Sealed this
Thirtieth Day of April, 2024

Katherine Kelly Vidal
*Director of the United States Patent and Trademark Office*